United States Patent [19]

Takagi et al.

[11] Patent Number: 4,810,022
[45] Date of Patent: Mar. 7, 1989

[54] AUTOMOTIVE VEHICLE WITH ADJUSTABLE AERODYNAMIC ACCESSORY AND CONTROL THEREFOR

[75] Inventors: Michitoshi Takagi, Kamakura; Takaaki Asano; Tsuguhiro Yamada, both of Yokosuka, all of Japan

[73] Assignee: Nissan Motor Company, Limited, Yokohama, Japan

[21] Appl. No.: 719,076

[22] Filed: Apr. 2, 1985

[30] Foreign Application Priority Data

Apr. 4, 1984 [JP] Japan ................................. 59-67062

[51] Int. Cl.⁴ ............................................. B62D 35/00
[52] U.S. Cl. .................................... 296/180.5; 296/11; 180/903; 180/197; 318/483; 364/561; 364/424.05
[58] Field of Search ........................... 296/14, 91, 217; 73/146; 180/197, 903; 318/483; 15/250 C; 364/561, 424, 425

[56] References Cited

U.S. PATENT DOCUMENTS

| 3,455,594 | 7/1969 | Hall et al. ............................. 296/1 S |
| 3,786,330 | 1/1974 | Inoue et al. .......................... 318/483 |
| 3,791,468 | 2/1974 | Bryan, Jr. ....................... 296/1 S X |
| 4,102,548 | 7/1978 | Kangas ................................. 296/1 S |
| 4,119,339 | 10/1978 | Heimburger ...................... 296/1 S |
| 4,174,863 | 11/1979 | Gotz .................................... 296/1 S |
| 4,317,073 | 2/1982 | Blaszkowski ...................... 318/483 |
| 4,457,558 | 7/1984 | Ishikawa ............................ 296/1 S |
| 4,489,806 | 12/1984 | Shimomura ....................... 296/1 S |
| 4,558,897 | 12/1985 | Okuyama et al. ................. 296/1 S |
| 4,561,064 | 12/1985 | Bruggen et al. .................... 364/561 |
| 4,630,226 | 12/1986 | Tanaka ............................ 73/627 X |

FOREIGN PATENT DOCUMENTS

| 2649953 | 5/1978 | Fed. Rep. of Germany . |
| 3003565 | 8/1981 | Fed. Rep. of Germany . |
| 3316129 | 11/1983 | Fed. Rep. of Germany . |
| 54-131220 | 10/1979 | Japan . |
| 58-22767 | 2/1983 | Japan . |
| 58-22768 | 2/1983 | Japan . |
| 58-85764 | 5/1983 | Japan . |
| 58-191672 | 11/1983 | Japan . |

Primary Examiner—Dennis H. Pedder
Attorney, Agent, or Firm—Foley & Lardner Schwartz, Jeffery, Schwaab, Mack, Blumenthal & Evans

[57] ABSTRACT

An aerodynamic accessory, such as a front and/or a rear spoiler, is adjustable by a deployed working position and a retracted rest position, and its positioning can be controlled automatically in accordance with vehicle conditions reflecting the need for road/tire traction. These vehicle conditions may include vehicle speed, crosswinds, road surface roughness or wetness, and/or road grade, these factors taken singly or in combination. The aerodynamic accessory may be a rear spoiler retractable to lie flush with the trunk lid and/or a front spoiler capable of selectably reducing the air-flow clearance between the road surface and the front end of the vehicle. Specific vehicle condition detection devices and techniques are also disclosed.

26 Claims, 18 Drawing Sheets

AUTOMOTIVE VEHICLE WITH ADJUSTABLE AERODYNAMIC ACCESSORY AND CONTROL THEREFOR

BACKGROUND OF THE INVENTION

The present invention relates generally to an automotive vehicle with an adjustable aerodynamic accessory which provides both an improvement in fuel economy and an improvement in driving stability. More particularly, the invention relates to a vehicle driving condition dependent control for the adjustable aerodynamic accessory of the automotive vehicle.

As is well known, the aerodynamics of an automotive vehicle are dominated by a drag coefficient Cd and a lift coefficient $C_L$. In order to ensure high driving stability, the lift coefficient must be held to a minimum value. When the lift coefficient is a negative value, a downward force is applied to the vehicle body, providing enhanced road/tyre traction and so improving high-speed stability of the vehicle. On the other hand, the drag coefficient degrades fuel economy as its value increases. Furthermore, when only fuel economy is concerned, negative lift on the vehicle body for good road/tyre traction also has an adverse effect.

In order to improve vehicular aerodynamics, spoilers, such as a front or chin spoiler, a rear spoiler and so forth, have been used widely minimize the lift coefficient. However, such spoilers tend to increase the drag coefficient and so adversely affect fuel economy. Furthermore, front spoilers tend to increase the forward extent of the vehicle and so degrade fuel economy.

In consideration of the balance between driving stability and fuel economy, driving stability is more important than fuel economy when the vehicle is travelling at relatively high speeds, and on the other hand, fuel economy is more important than driving stability when the vehicle is travelling at relatively low speed.

Various aerodynamic accessory and controls have been proposed to provide a good balance between driving stability and fuel economy. For example, the Japanese Patent First Publications (Tokkai) Showa 54-131220, published Oct. 12, 1979, and Showa 58-22767, published on Feb. 10, 1983 disclose adjustable front spoilers which are movable between an extended position projecting from the lower edge of the front apron or air-dam of the vehicle body and a contracted position hidden behind the front apron, depending upon the vehicle driving speed. The Japanese Patent First Publication (Tokkai) Showa 58-22768, Feb. 10, 1983, discloses a front spoiler which can be operated in the contracted position in response to application of vehicular brakes. The Japanese Patent First Publication (Tokkai) Showa 58-85764, published on May 23, 1983, discloses an adjustable spoiler movable between extended and contracted positions depending upon air flow pressure at the front air-dam. The Japanese Patent First Publication No. 58-191672, published on Nov. 8, 1983 discloses a vehicle speed and vehicle height dependent front spoiler control.

However, the conventional spoiler control techniques are not considered to be complete since spoiler position can not be controlled precisely with regard to vehicle driving conditions.

SUMMARY OF THE INVENTION

Therefore, it is an object of the present invention to provide an aerodynamic accessory which can provide a good balance between driving stability and fuel economy.

Another object of the invention is to provide an aerodynamic accessory which can be adjusted in precise accordance with vehicle driving conditions.

A further object of the invention is to provide a control system for controlling an aerodynamic accessory precisely according to vehicle driving conditions derived from various control parameters including vehicle speed.

A still further object of the invention is to provide an aerodynamic accessory control system which takes into account various control parameters including the vehicle speed, crosswind, road surface conditions and so forth.

In order to accomplish the above-mentioned and other objects, an aerodynamic apparatus comprises a spoiler fin mounted on a vehicle body. The spoiler fin is movable between a working position in which the spoiler projects from the vehicle body for reducing the lift coefficient and a rest position in which the spoiler is retracted within the vehicle body. The spoiler position is chosen on the basis of vehicle driving conditions including vehicle speed and environmental conditions around the vehicle.

According to one aspect of the invention, an aerodynamic accessory for an automotive vehicle comprises a spoiler member capable of projecting from an external surface of a vehicle body and so reducing the lift coefficient of the vehicle body while the vehicle is moving, the spoiler member being movable between a first position in which it projects from the external surface of the vehicle body, and a second position in which it is enclosed substantially within the contours of the vehicle body and so has no aerodynamic effect, an actuator associated with the spoiler member for actuating the spoiler member to either of the first and second positions, sensor means for monitoring vehicle driving conditions and producing a driving condition indicative signal, the sensor means also detecting environmental conditions around the moving vehicle and producing a environmental condition indicative signal, and a controller responsive to the vehicle driving condition indicative signal and the environmental condition indicative signal for deriving a control signal to control operation of the actuator and thereby control the position of the spoiler member, the controller producing a control signal ordering the spoiler member to the first position when a predetermined vehicle driving condition is satisfied as indicated by the vehicle driving condition indicative signal and an environmental condition as indicated by the environment condition indicative signal is satisfied, and otherwise producing a control signal ordering the spoiler member to the second position.

According to another aspect of the invention, an method for controlling the position of a adjustable-position air-spoiler for an automotive vehicle comprises the steps of:

monitoring vehicle driving behavior including vehicle speed and producing a vehicle driving condition indicative signal;

monitoring environmental conditions of the moving vehicle and producing an environmental condition indicative signal;

judging the operating conditions of the moving vehicle on the basis of the vehicle driving condition indicative signal and the environmental condition indicative signal;

adjusting the spoiler position between a first position in which the spoiler projects from the external surface of the vehicle body in order to reduce the lift coefficient of the vehicle and a second position in which the spoiler has minimal aerodynamic effect, the spoiler being adjusted to the first position when the judged condition indicates a relatively high road/tyre traction requirement.

BRIEF DESCRIPTION OF THE DRAWINGS

The present invention will be understood more fully from the detailed description given hereinbelow and from the accompanying drawings of the preferred embodiments of the invention, which however, should not be taken to limit the invention to the specific embodiments but are for explanation and understanding only.

In the drawings.

DESCRIPTION OF THE PREFERRED EMBODIMENT

Figure 1:
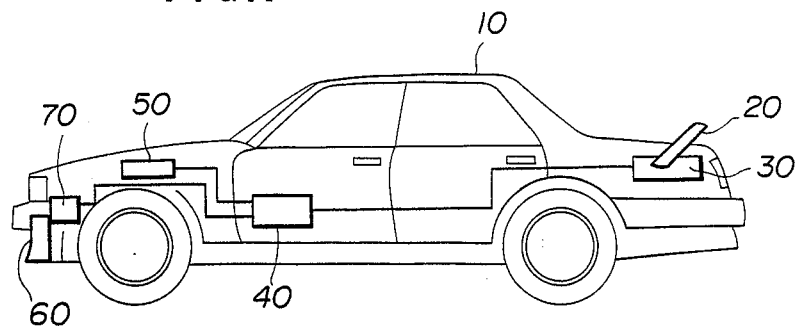
FIG. 1 is a diagram of an automotive vehicle to which adjustable aerodynamic accessory and a control system therefor according to the invention are applied.

Referring now to the drawings, particularly to FIG. 1, the general structure of the preferred embodiment of an aerodynamic accessory or accessories and control therefor in accordance with the present invention, will be described briefly. An automotive vehicle 10 has a rear spoiler 20 which is connected to a rear spoiler actuator 30 for operating the rear spoiler to either of at least two positions. The rear spoiler position at which the rear spoiler lies flush with a trunk lid or rear end of the vehicle and so exerts little or no aerodynamic effect will be referred to hereafter as "rest position". Conversely, the position of the rear spoiler at which the rear spoiler projects from the rear end of the vehicle at a given angle relative to the air flow along the vehicle body so as to divert the air flow away from the vehicle body and thus is effective as a rear spoiler, will be referred to hereafter as the "working position".

The rear spoiler actuator 30 is connected to a controller 40 which produces a rear spoiler control signal ordering the actuator to actuate the rear spoiler 20 to one of the rest or working positions. The controller 40 is connected with a sensor unit 50 which monitors vehicle driving conditions. In the preferred embodiments, vehicle speed, crosswind, road surface conditions, vehicle height, i.e. road clearance, headlight refraction by precipitation, deceleration, road grade, cornering force on the vehicle and so forth are selectively used as spoiler position control parameters. Therefore, the sensor unit 50 is designed to detect selected spoiler position control parameter of parameters and output sensor signal or signals depending upon the vehicle driving conditions. The controller 40 uses the sensor signal or signals to derive the rear spoiler control signal.

In FIG. 1, the vehicle 10 also has a front or air-dam spoiler 60. The front spoiler 60 is connected to a front spoiler actuator 70 which actuates the front spoiler between at least two positions. The position of the front spoiler at which the front spoiler 60 is hidden behind an air-dam or apron of the vehicular front end and is thus aerodynamically ineffective will be referred to hereafter as "rest position". Conversely, the position of the front spoiler wherein the front spoiler projects downwards from the lower edge of the front air-dam and thus acts as a spoiler reducing the air flow beneath the vehicle body, which would otherwise cause an increase in the lift coefficient, will be referred to hereafter as the "working position".

The front spoiler actuator 70 receives a front spoiler control signal from the controller 40. The controller 40 derives the front spoiler control signal specifying the desired position of the front spoiler 60 on the basis of the sensor signals.

As set forth above, the principle idea of the present invention is to adjust the position of front and/or rear spoilers. The positions of the spoilers should be in precise accordance with vehicle driving conditions as indicated by the vehicle speed, crosswind, road surface conditions, vehicle height, headlight refraction by rain, etc., deceleration, road grade, cornering force and so forth. As a general rule, the spoilers will be in their working positions when the vehicle is moving at relatively high speeds, thus requiring driving stability more than fuel economy, and in their rest positions when the vehicle is not moving at such high speeds, thus emphasizing fuel economy over driving stability. Therefore, the controller 40 produces the spoiler control signals ordering the actuators 30 and 70 to actuate the spoilers 20 and 60 to their working position when the vehicle is detected to be moving at a high speed and satisfying other control conditions represented by preselected control parameters. Otherwise, the controller 40 outputs different control signal values for holding the spoilers in their rest positions.

In the shown arrangement, the controller 40 may control the positions of the front and rear spoilers independently. Therefore, in practice, the controller 40 may deploy the spoilers in four (4) patterns:

in the first pattern, both of the front and rear spoilers 20 and 60 are in their rest positions;

in the second pattern, the front spoiler is moved to its working position but the rear spoiler remains in its rest position;

in the third pattern, the front spoiler is held in its rest position and the rear spoiler is moved to its working position; and in the fourth pattern, both of the front and rear spoilers are moved to their working positions.

In this case, the controller 40 produces separate front and rear spoiler control signals, each of which varies between two signal levels in an ON/OFF manner. Throughout this disclosure, it is assumed that a HIGH-level control signal orders the spoiler to its working position and a LOW-level control signal orders the actuator to hold the spoiler in its rest position.

It should be appreciated that, although the system disclosed with reference to FIG. 1 has both front and rear spoilers, it is not always necessaray to provide both front and rear spoilers. In cases, where only one front or rear spoiler is installed, the controller may be simply changed to produce a single control signal. The following disclosure with respect to some of the preferred embodiments concerns single spoiler arrangements.

Figure 2:
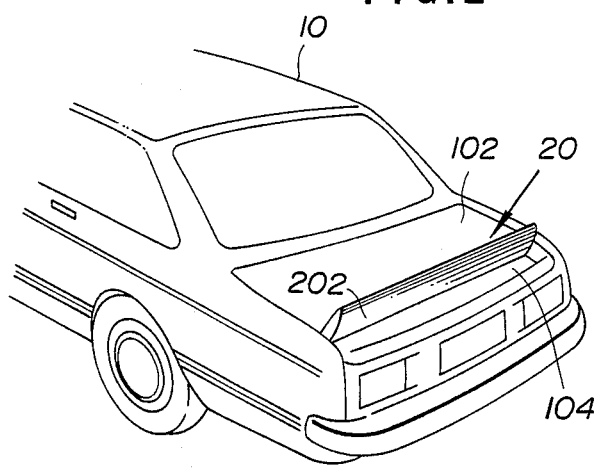
FIG. 2 is a perspective view of the rear half of the automotive vehicle employing the first embodiment of an adjustable rear spoiler in accordance with the invention.
Figure 3A:
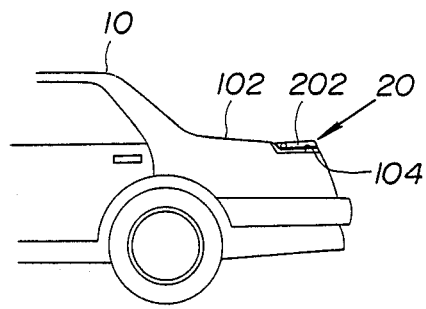
FIGS. 3(A) and 3(B) show the two operating positions of the adjustable rear spoiler of FIG. 2.
Figure 3B:
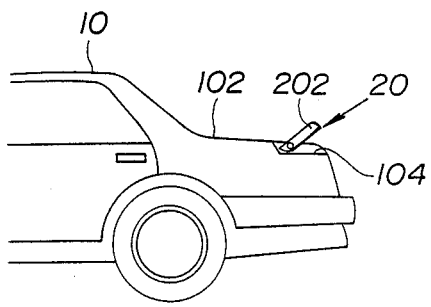

FIG. 2 illustrates the first embodiment of the aerodynamic system in accordance with the invention. As will be appreciated herefrom, the first embodiment concerns a rear spoiler arrangement in which the spoiler is adjustable between the rest position and the working position. The rear spoiler 20 comprises a rear spoiler fin 202. The rear spoiler fin 202 cooperates with a trunk lid 102 of the vehicle body and is pivotably received within a recess 104 formed in the rear end of the trunk lid. The rear spoiler fin 202 is adjustable between the rest position and the working position as shown in FIGS. 3(A) and 3(B). In the rest position, the upper surface of the rear spoiler fin 202 lies flush with the trunk lid outer surface to form a flush vehicle rear end body surface. Conversely, in the working position, the rear spoiler fin 202 is tilted up toward the rear to form an air flow guide surface directed away from the rear end of the vehicle body. This effectively diverts the air flow along the vehicle body surface so as to reduce the lift coefficient which would otherwise be applied to the vehicle body. The angle of the spoiler fin is selected to convert the force applied to the fin by the air flow into a downward force on the rear end of the vehicle, thus increasing road/tyre friction for better power transmission through the vehicular wheels. This is particularly effective for vehicles having rear driving wheels. On the other hand, moving the rear spoiler fin to the working position increases the drag coefficient of the vehicle to some extent. This can of course be corrected by returning the rear spoiler fin 202 to the rest position, thus increasing the lift coefficient.

Figure 4:
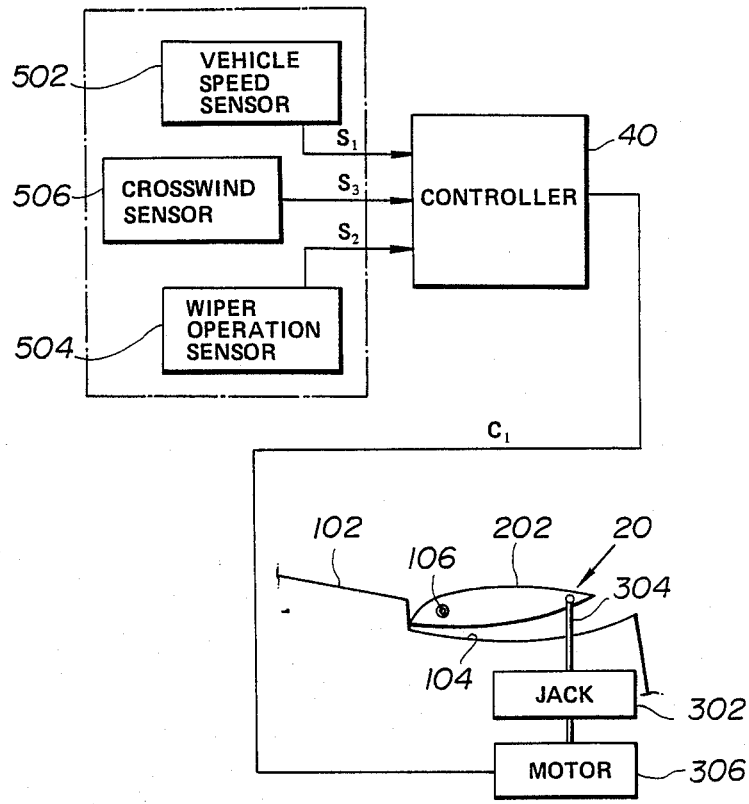
FIG. 4 schematically shows the first embodiment of a control system for the rear spoiler of FIG. 2.

FIG. 4 shows a rear spoiler control system employed in the first embodiment of the invention. The front edge of the rear spoiler fin 202 is pivotably attached to the inner periphery of the recess 104 formed along the rear edge of the trunk lid 102 by means of a pivot shaft 106. The rear spoiler fin 202 is connected to the actuator 30 which comprises an electric motor 306 and a pantograph-type jack rod 304 driven by the motor. The jack rod 304 is connected to a point on the rear spoiler fin 202 near its rear edge. Although a single jack 304 has been illustrated in FIG. 4, it may be preferable to used a pair of jacks near the opposite ends of the fin 202. The jack 304 may be directly driven by the motor 306 or in the preferred structure, a reduction gear or gears may be inserted between the motor output and the jack 304. The motor 302 should be a reversible motor capable of moving the rear edge of the rear spoiler fin 202 up and down.

The motor 302 is connected to the controller 40 which comprises a monolithic microprocessor. The controller 40 is, in turn, connected to a vehicle speed sensor 502, a wiper operation sensor 504 and a crosswind sensor 506. The vehicle speed sensor 502, the wiper operation sensor 504 and the crosswind sensor 506 may together form the sensor means 50 mentioned above with respect to FIG. 1. The vehicle speed sensor 502 produces a vehicle speed indicative signal having a value representative of the vehicle speed. The wiper operation sensor 504 responds to wiper operation by outputting a HIGH-level wiper operation indicative signal and, otherwise, produces a LOW-level wiper operation indicative signal.

Figure 6:
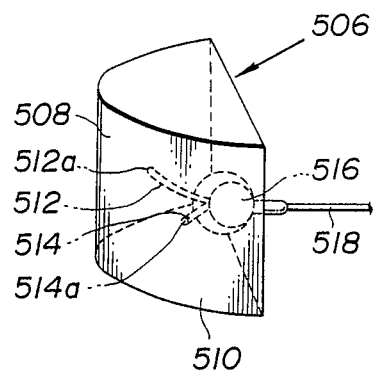
FIG. 6 is a perspective illustration of a crosswind sensor employed in the first embodiment of the rear spoiler control system of FIG. 5.

The crosswind sensor 506 may be mounted at an appropriate point of the external surface of the vehicle body exposed to crosswinds. As shown in FIG. 6, the crosswind sensor 506 has a sensor housing 507 with sensor surfaces 508 and 510. The sensor surfaces 508 and 510 are generally directed in opposite directions so as to be exposed to crosswinds toward either side of the vehicle. Air flow paths 512 and 514 are defined within the sensor housing. The air flow paths 512 and 514 have respective outer ends 512a and 514a opening onto corresponding sensor surfaces 508 and 510. The inner ends of the air flow pathes 512 and 514 are connected to a pressure/voltage transducer 516. The pressure/voltage transducer 516 produces voltage signals representative of the pressure in the air flow paths. The pressure applied to the pressure/voltage transducer 516 varies with the magnitude of the crosswind. Thus, the voltage signals represent the magnitude of the crosswind. The voltage signals produced by the crosswind sensor will be referred to hereafter as a "crosswind indicative signal".

The crosswind indicative signal produced by the crosswind sensor is conducted from the sensor to the controller 40 through a lead wire 518.

Figure 5:
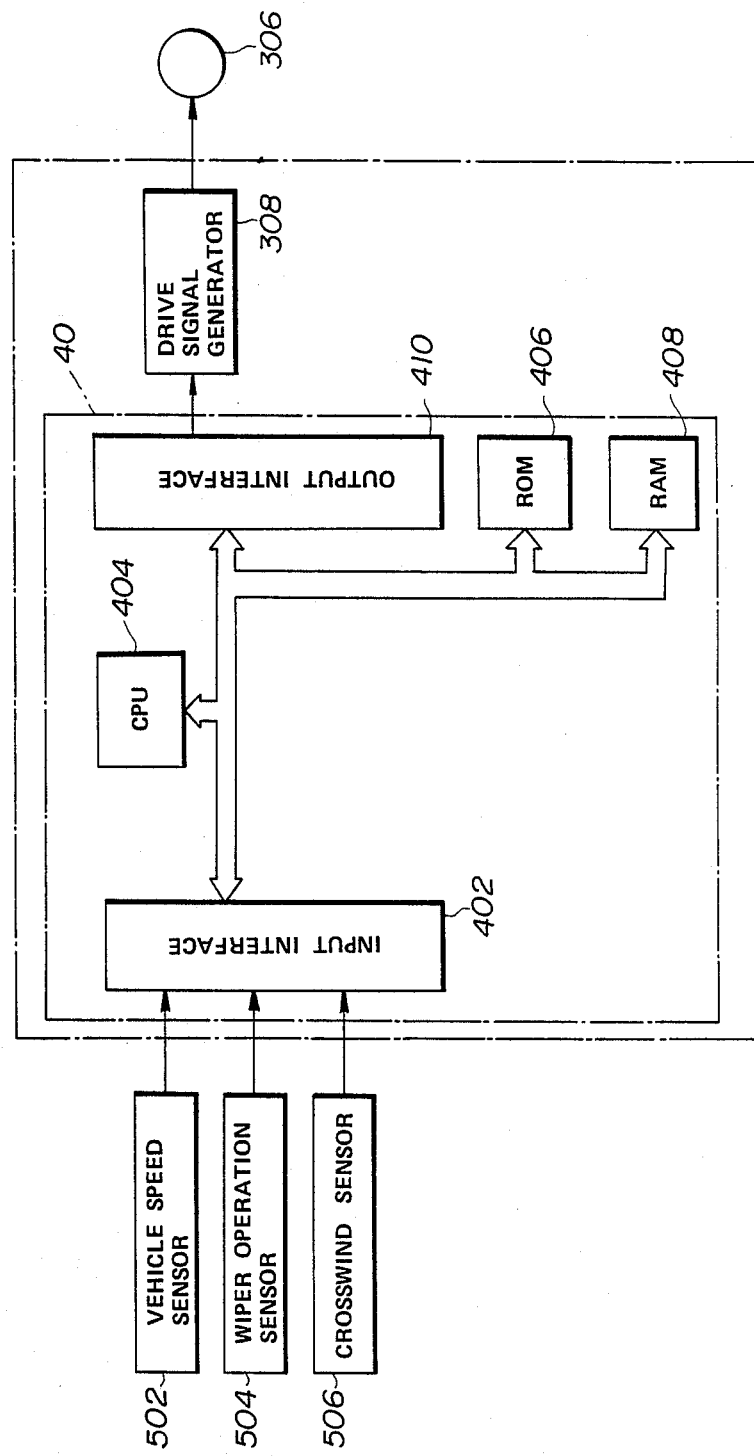
FIG. 5 is a schematic block diagram of the first embodiment of a rear spoiler control system in accordance with the invention.

In FIGS. 4 and 5, the vehicle speed indicative signal is labeled $S_1$, the wiper operation indicative signal is labeled $S_2$ and the crosswind indicative signal is labeled $S_3$. As mentioned above, the controller 40 comprises a microprocessor which as is well known, consists predominantly of an input interface 402, CPU 404, ROM 406, RAM 408 and an output interface 410. The output interface 410 is connected to a drive signal generator 308 interposed between the controller 40 and the motor 306. The drive signal generator 308 is responsive to the rear spoiler control signal $C_1$ output through the output interface 410 to generate the drive signal $S_4$ with a polarity depending upon the control signal level. Throughout this disclosure, polarity of the drive signal $S_4$ driving the motor in the direction in which the rear spoiler fin 202 is moved toward the working position will be referred to as "forward direction" and the opposite polarity will be referred to as "reverse direction". If desired, the drive signal generator 308 may be feedback controlled by feeding back a motor position indicative signal to the drive signal generator for stopping the motor at predetermined rear spoiler fin positions, specifically the working and rest positions.

In cases where the vehicle speed indicative signal $S_1$ is a frequency signal having a frequency proportional to the vehicle speed, the CPU 404 may be provided with a vehicle speed counter for deriving a vehicle speed value on the basis of the frequency of the vehicle speed indicative signal. Processes for deriving vehicle speed from a frequency signal indicative of vehicle speed are well known and need not be explained in detail here.

Figure 7:
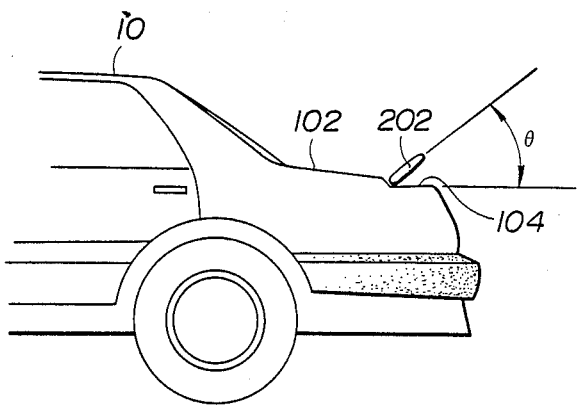
FIG. 7 is a diagram explaining the effect of the first embodiment of the adjustable rear spoiler of FIG. 2.
Figure 8:
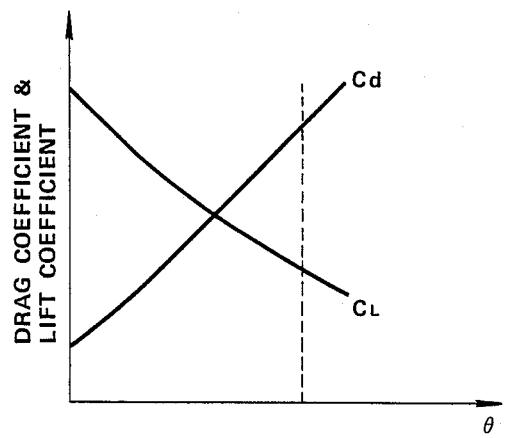
FIG. 8 shows the changes in drag coefficient and lift coefficient according to changes in the rear spoiler angle.

As shown in FIGS. 7 and 8, the drag coefficient $C_d$ and lift coefficient $C_L$ are approximately inversely related and vary with the rear spoiler angle $\theta$ with respect to the vehicle body surface plane $\theta_0$, as shown in FIG. 8. Specifically, as the rear spoiler angle $\theta$ increases, the drag coefficient $C_d$ increases monotonically but slightly non-linearly as can be seen in FIG. 8. This is because as the rear spoiler angle increases within a reasonable range, the vacuum at the rear end of the vehicle is enhanced to increase the rearward force applied to the vehicle as drag. At the same time, increasing the rear spoiler angle $\theta$ causes the lift coefficient to decrease monotonically but non-linearly. This is because the downward force applied to the vehicle body increases as the rear spoiler angle $\theta$ increases.

As will be appreciated herefrom, from the standpoint of fuel economy, it would be better to keep the rear spoiler angle $\theta$ as small as possible and, conversely, from the point of view of driving stability, it would be desirable to maximize the rear spoiler angle $\theta$. The first embodiment of the spoiler control system according to the present invention achieves a good balance between the fuel economy and driving stability by precisely selecting the rear spoiler positions according to the vehicle driving conditions.

Figure 9:
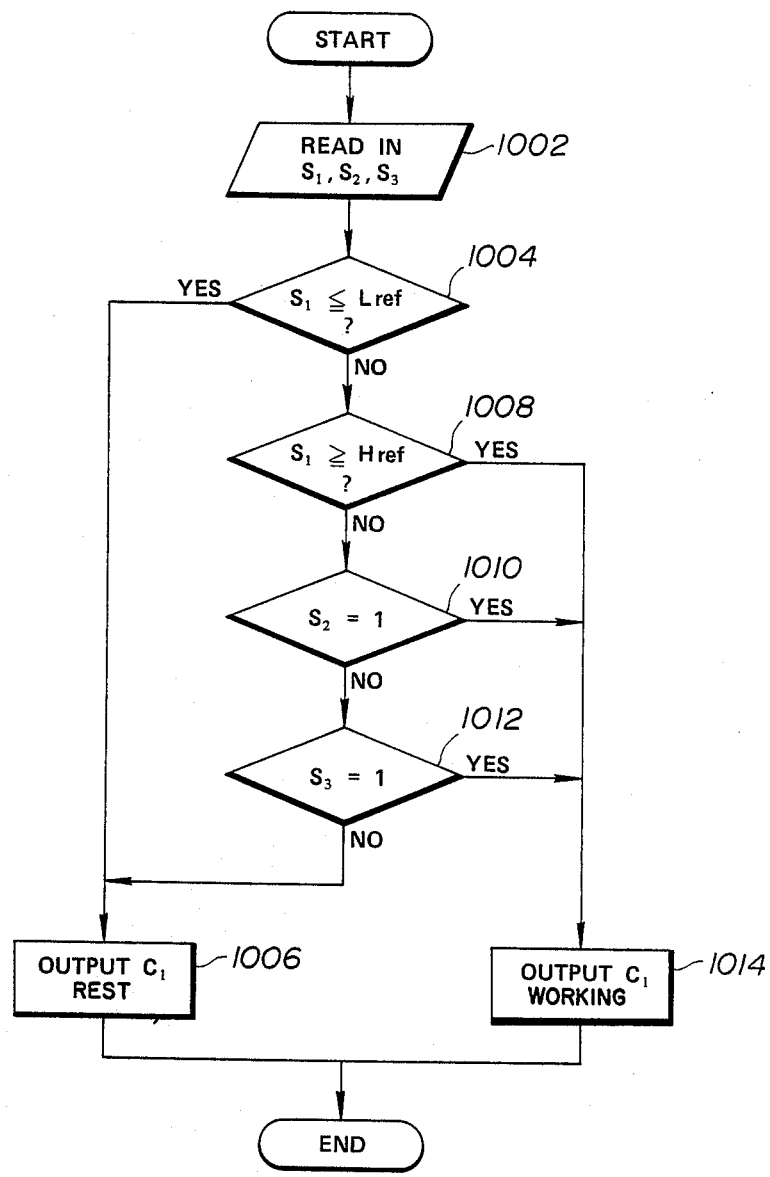
FIG. 9 is a flowchart of a rear spoiler control program executed in the first embodiment of the rear spoiler control system of FIG. 5.

FIG. 9 shows a rear spoiler control program executed by the controller 40 of the spoiler control system of the first embodiment. The shown program may be executed periodically. Immediately after starting execution, data from the vehicle speed sensor 502, the wiper operation sensor 504 and the crosswind sensor 506 are read in at a block 1002. Thereafter, the vehicle speed indicative signal value $S_1$ is compared to a lower vehicle speed threshold $L_{ref}$ at a block 1004. If the vehicle speed indicative signal value $S_1$ is equal to or less than the lower vehicle speed threshold $L_{ref}$, then a LOW-level control signal $C_1$ is sent to the drive signal generator 308, at a block 1006. The drive signal generator 308 is responsive to the LOW-level control signal to order the rear spoiler to its rest position. If the rear spoiler fin 202 is already in its rest position, then the drive signal generator 308 remains quiescent to hold the rear spoiler fin in its rest position. On the other hand, if the rear spoiler fin 202 is in its working position, the drive signal generator 308 produces a drive signal $S_4$ of the reverse polarity for driving motor 306 so as to shift the rear spoiler fin toward the rest position.

If the vehicle speed indicative signal value $S_1$ is greater than the lower vehicle speed threshold $L_{ref}$, the vehicle speed indicative signal value $S_1$ is compared with a higher vehicle speed threshold $H_{ref}$, at a block 1008. If the vehicle speed indicative signal value $S_1$ is less than the vehicle speed threshold $H_{ref}$, then the wiper operation sensor signal $S_2$ is checked to see if it is HIGH at a block 1010. If not, then the crosswind sensor signal $S_3$ is checked to see if it is HIGH, indicating that the magnitude of the crosswind is greater than a predetermined level, at a block 1012. If the crosswind sensor signal is LOW when checked at the block 1012, then control passes to the block 1006 in which the LOW-level control signal $C_1$ is sent to the drive signal generator 308. Conversely, if the vehicle speed indicative signal value is equal to or greater than the higher vehicle speed threshold $H_{ref}$, or if the wiper operation indicative signal is HIGH, or if the crosswind sensor signal $S_3$ is HIGH, the HIGH-level control signal $C_1$ is then produced and transmitted to the drive signal generator 308.

As mentioned before, the drive signal generator 308 is sensitive to both the control signal $C_1$ and to the rear spoiler fin position. If the rear spoiler fin 202 is in the working position already, the drive signal generator will remain quiescent in response to the HIGH-level control signal $C_1$ and so hold the rear spoiler fin in its working position. Conversely, if the rear spoiler fin 202 is in its rest position, the drive signal generator 308 will send a drive signal $S_4$ to the motor 306 with the forward polarity to drive the motor so as to shift the fin from its rest position to the working position.

As can be appreciated from FIG. 9, when the vehicle speed is relatively high, or the road surface is relatively slippery as detected by the wiper operation sensor which, in practice, is used to detect wet road conditions, and/or a strong crosswind is blowing, the rear spoiler fin is actuated to the working position to ensure sufficient driving stability. On the other hand, it the vehicle is running at a relatively low speed, or the road is dry and the crosswind is not so strong, the rear spoiler is returned to its rest position to reduce the drag coefficient and so provide better fuel conservation characteristics. Consequently, the first embodiment of the adjustable rear spoiler control as set forth above, provides a good balance between fuel economy and driving stability.

Figure 10:
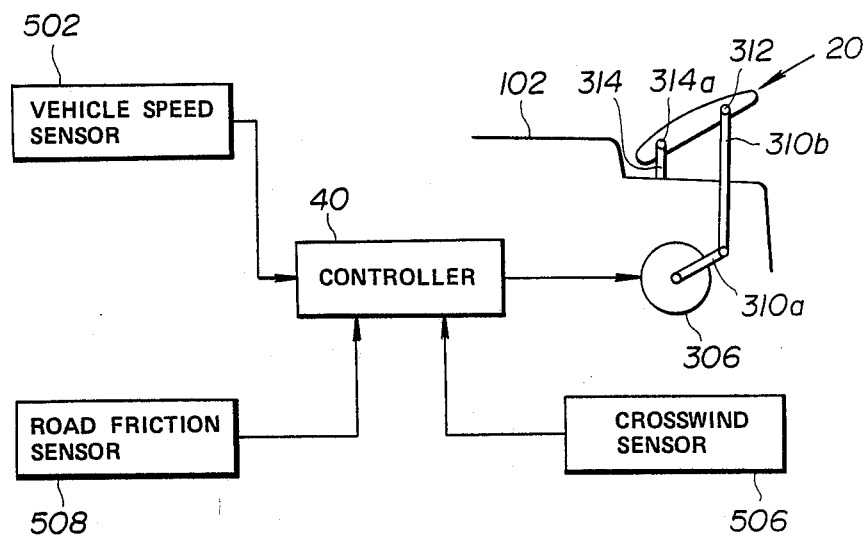
FIG. 10 is a schematic block diagram of the second embodiment of the adjustable rear spoiler control system in accordance with the present invention.

FIG. 10 is a schematic block diagram of the second embodiment of the adjustable rear spoiler control system according to the invention. In this embodiment, a road friction sensor 508 is employed as a replacement for the wiper operation sensor as in the foregoing first embodiment.

Figure 11:
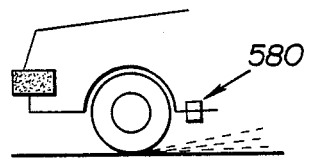
FIG. 11 is a diagram of one example of a road friction sensor employed in the second embodiment of the adjustable spoiler control system of FIG. 10.
Figure 12:
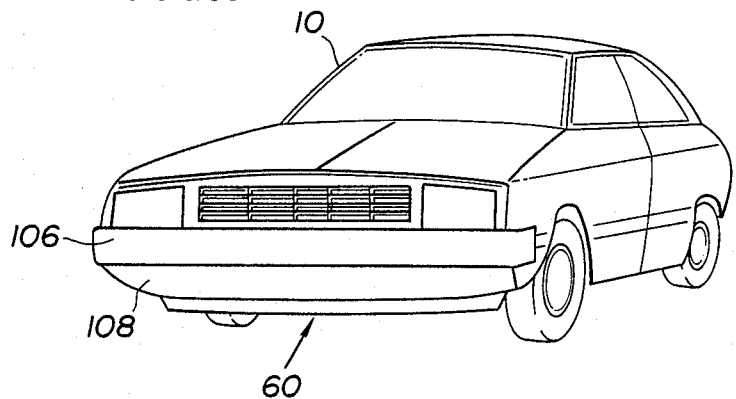
FIG. 12 is a perspective view from the front and left of automotive vehicle employing the third embodiment of an adjustable front spoiler in accordance with the invention.

FIG. 11 shows one example of the road friction sensor employed in the second embodiment of the rear spoiler control system according to the invention. The road friction sensor 508 comprises an ultrasonic sensor fixed to the vehicle body, e.g. to the side sill next to a wheel house. The ultra-sonic sensor emits ultra-sonic waves downwards toward the road surface. The ultrasonic sensor then derives the average distance between the road surface and the vehicle body from the roundtrip propagation time. On the basis of the derived average height, the instantaneous height which may be influenced by splash-back from the adjoining wheel. This is, in other words, useful for detecting wet road surface conditions by detecting the occurrence of splash-back from the wheel. The ultra-sonic sensor serving as the road friction sensor includes means for discriminating between wet and dry road surface conditions by detecting fluctuations in the vehicle height due to splashed water. When splashed water is detected, the ultra-sonic sensor outputs a HIGH-level, low-friction indicative signal to the controller 40. The controller 40 utilizes the signal from the ultra-sonic sensor as one of the spoiler control parameters for controlling the rear spoiler between the working position and the rest position.

Road friction may be detected in various ways other than the use of the ultra-sonic sensor. For example, road friction can be derived from the combination of vehicle speed, steering angular variation and steering velocity. First, the steering torque under normal dry road surface conditions in relation to the vehicle speed, steering angular variation and steering velocity is measured to derive a reference value. Actual steering torque is then measured and compared to the reference value in order to judge whether or not the coefficient of friction of the road surface is lower under normal, dry road surface conditions. If a steering torque smaller than the reference value is detected, the low-friction road surface is signalled by producing a low-friction indicative signal. In another approach, the road friction may be detected by comparing the angular velocities of a driving wheel and a driven wheel. This technique for detecting road friction depending upon the speed difference between driving wheels and driven wheels has been disclosed in the co-pending U.S. patent application Ser. No. 657,953, filed on Oct. 5, 1984 now U.S. Pat. No. 4,640,395. The contents of the above-identified prior invention is hereby incorporated by reference for the sake of disclosure.

As will be appreciated from FIG. 10, the second embodiment of the rear spoiler control system according to the present invention is applicable to a wing-type rear spoiler 20. In the wing-type rear spoiler structure, the spoiler fin 202 is pivotably supported within a recess 104 by means of a mounting bracket 314. The front edge of the rear spoiler fin 202 pivots about a pivot shaft 314a extending through the mounting bracket 314. The rear edge of the rear spoiler fin 202 is connected to a driving motor 306 through linkages 310a and 310b wich form a rear spoiler operating link mechanism 310. The linkage 310a is directly connected to the drive shaft of the driving motor 306 for rotation therewith. Rotational movement of the linkage 310a is converted into vertical motion by the second linkage 310b. In this arrangement, the rear end of the spoiler fin 202 moves up and down as the driving motor 306 turns.

In the second embodiment, the position of the rear spoiler 20 is controlled in substantially the same manner as described with respect to the foregoing first embodiment. For instance, if the vehicle speed is lower than a lower vehicle speed criterion, the road surface is dry enough to provide adequate traction and the crosswinds are weaker than a crosswind criterion when vehicle speed is between lower and higher criteria, the rear spoiler held in the rest position for greater fuel economy. On the other hand, when the vehicle speed is higher than the higher vehicle speed criterion, or the vehicle speed is inbetween the higher and lower criteria and the road surface friction is lower than a given value, and/or the crosswinds are stronger than the crosswind criterion, the rear spoiler is moved to the working position.

FIGS. 12 to 15 show the third embodiment of the aerodynamic accessory of the automotive vehicle according to the present invention. In this embodiment, the front spoiler 60 is installed on the vehicle. The front spoiler 60 is movable between the working position at which it extends downwards from the lower edge of a front apron or air-dam 108 of the vehicle body, and a rest position wherein it is hidden behind the front apron 108.

Figure 13:
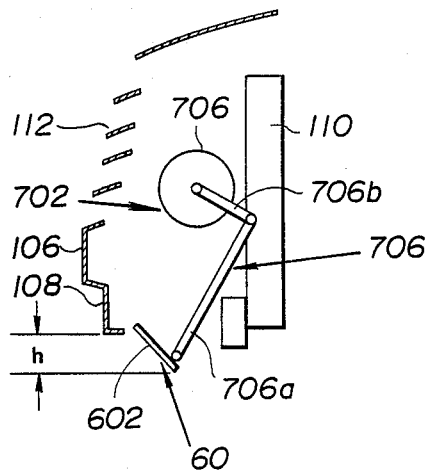
FIG. 13 is a cross-section through part of the mechanism of the adjustable front spoiler of FIG. 12.

As shown in FIG. 13, the front spoiler 60 comprises a front spoiler fin 602 pivotably mounted on the vehicle body for movement between the working position and the rest position. A driving motor 704 is connected to the front spoiler fin 602 to drive the latter via a link mechanism 706. The link mechanism 706 comprises a first lower link 706a connected to the lower edge of the front spoiler fin 602, and a second upper link connected to a drive shaft 704a of the driving motor 704. The driving motor 704 may be mounted in front of a radiator 110 of the vehicle engine system, which radiator is positioned within the forward engine compartment in the vehicle body opposite a radiator grill 112. In the shown vehicle, the front apron is formed integrally with a front bumper 106 and supported in conjunction with the bumper in a well-known manner by means of a bumper stay. In FIG. 13, the reference numeral 114 denotes a front engine hood for covering the engine compartment.

Figure 14A:
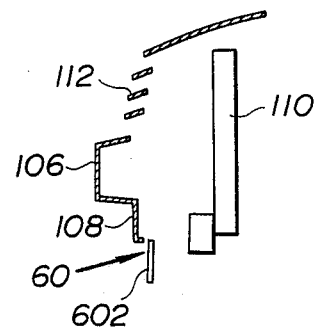
FIGS. 14(A) and 14(B) show the operating positions of the adjustable front spoiler of FIG. 12.
Figure 14B:
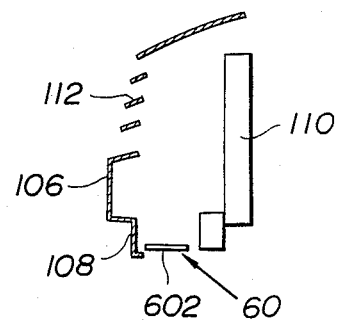

As shown in FIGS. 14(A) and 14(B), the front spoiler fin 602 is movable between its rest position and its working position in which it reduces the clearance from the road surface and so reduces the air flow beneath the vehicle. The air flow beneath the vehicle body cooperates with the air flow along the upper vehicle body surface to exert a net lift on the vehicle. This is especially true when the vehicle bottom is not flat, but rather has irregularities due to the presence of the propeller shaft, exhaust pipe, muffler and so forth so that air flow beneath the vehicle body is somewhat obstructed. This has a noticeable effect on the drivability of the vehicle.

In the rest position, the front spoiler fin 602 lies essentially horizontal with its forward edge lying above the lower edge of the front apron 108. This reduces the front cross-sectional area of the vehicle and so reduces the vehicle's wind resistance which is multiplied by the drag coefficient to determine the overall drag exerted on the moving vehicle.

Figure 15:
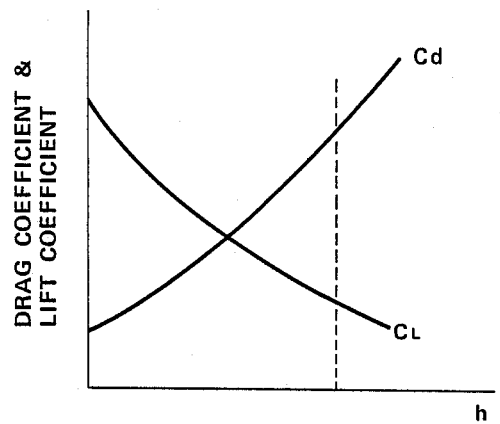
FIG. 15 shows the behavior of the drag coefficient and the lift coefficient in relation to extent of projection of the adjustable front spoiler of FIG. 12.

FIG. 15 shows the relationship between the extension height h of the front spoiler fin from the lower end of the front apron 108 (FIG. 11) and the coefficients of drag and lift $C_d$, $C_L$ of the vehicle. As will be appreciated, the lift coefficient $C_L$ decreases non-linearly as the extension height h increases. Conversely, the drag coefficient $C_d$ increases non-linearly as the extension height h increases.

The third embodiment of the front spoiler can be controlled according to vehicle driving conditions by means of the control system as set out either in the first embodiment or in the second embodiment.

Figure 16:
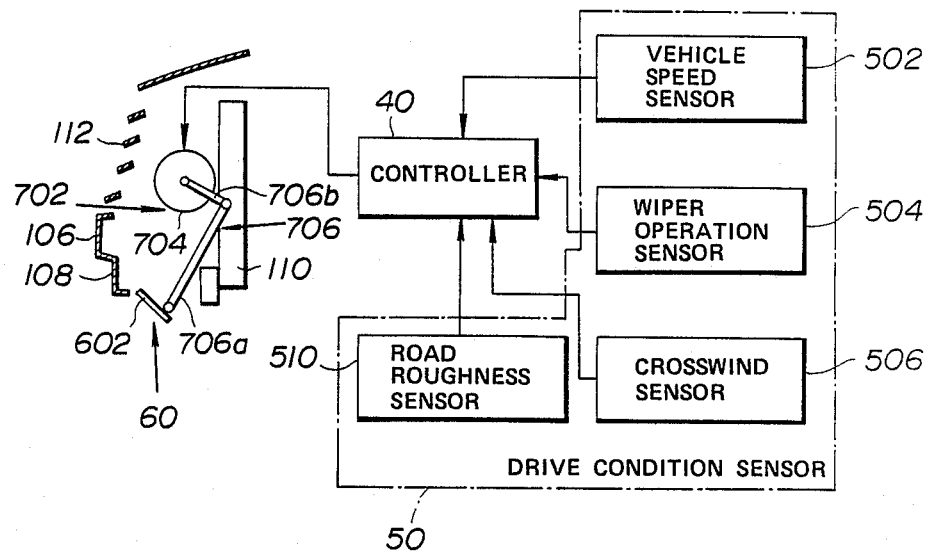
FIG. 16 is a schematic illustration of the fourth embodiment of the front spoiler control system in accordance with the invention, for controlling the position of the front spoiler of FIG. 12.

FIG. 16 shows a control system applicable according to the fourth embodiment of the invention. In order to control the position of the front spoiler fin 602, the controller 40 is connected to the driving motor 704 through a drive signal generator 710. The controller 40 is, in turn, connected to the vehicle speed sensor 502, the wiper operation sensor 504, the crosswind sensor 506 and a road roughness sensor 510. The road roughness sensor 510 may comprise an ultra-sonic sensor for detecting distance from the road surface and thereby detect fluctuations in the measured distance indicative of road surface roughness. Ultra-sonic sensors utilized for this purpose have been disclosed in the co-pending U.S. patent applications Ser. Nos. 647,648 and 691,531, respectively filed on Sept. 6, 1984 and Jan. 15, 1985, now, respectively, abandoned and Pat. No. 4,770,438. The contents of the above-identified prior inventions are hereby incorporated by reference for the sake of disclosure.

Figure 17:
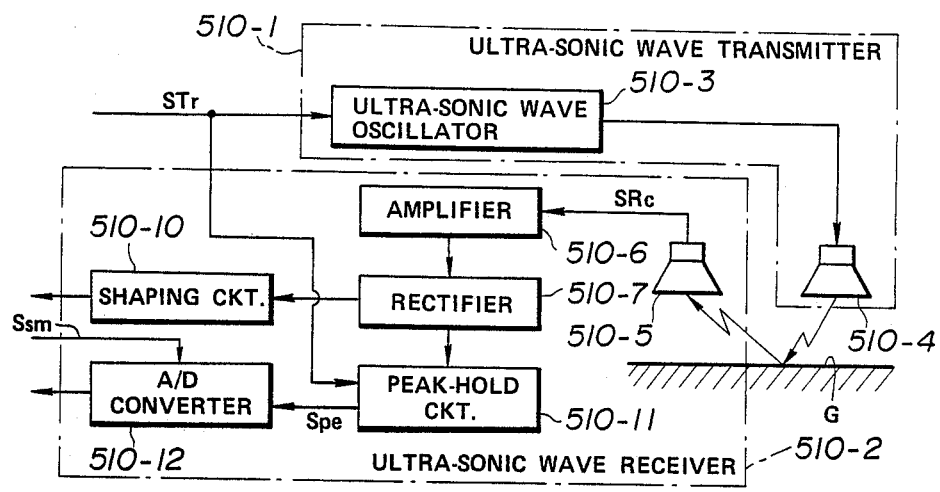
FIG. 17 is a block diagram of an example of a road roughness sensor employed in the fourth embodiment of control system of the invention, in which an ultrasonic sensor is employed.

As shown in FIG. 17, the ultra-sonic sensor 510 generally comprises an ultra-sonic wve transmitter 510-1 and a reflected ultra-sonic wave receiver 510-2. The transmitter 510-1 receives a trigger signal $S_{Tr}$ at a given timing from the controller 40. The transmitter 510-1 includes an ultra-sonic oscillator 510-3 and an ultra-sonic wave transmitting section 510-4. The ultra-sonic oscillator 510-3 is responsive to the trigger signal $S_{Tr}$ from the controller 40, which is issued periodically or intermittently, to transmit or discharge ultra-sonic waves through the transmitter section 510-4 toward the road surface.

The ultra-sonic waves reflected by the road surface are received by a receiver section 510-5 of the receiver 510-2. The receiver station 38 produces a receiver signal $S_{Rc}$ having a value varying in accordance with the amplitude of the received ultra-sonic waves. The receiver section 510-5 is connected to an amplifier 510-6 to supply the receiver signal $S_{Rc}$ to the latter. The receiver signal $S_{Rc}$ is amplified by the amplifier 510-6 and transmitted to a rectifier 510-7. The rectifier 510-7 is connected to the band-pass filters through a shaping circuit 510-10. The rectifier 510-7 is also connected to a peak-hold circuit 510-11 which holds the peak value of the receiver signal. The peak-hold circuit 510-11 produces an analog peak-value-indicative signal $S_{Pe}$ having a value proportional to the held peak value. The peak-hold circuit 510-11 is connected for output to the controller 40 via an analog-to-digital converter 510-12. The analog-to-digital converter 510-12 outputs a binary signal indicative of the peak-value-indicative signal value to the controller 40.

The peak-hold circuit 510-11 is also connected to the controller 40 to receive the trigger signal $S_{Tr}$. The peak-hold circuit 510-11 is responsive to the trigger signal from the controller to clear the currently held value.

Figure 18:
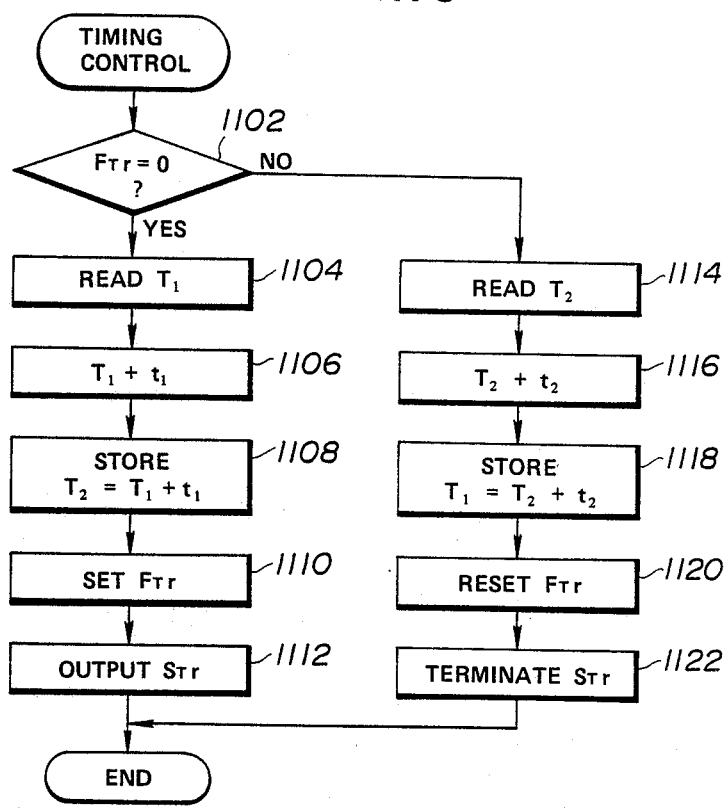
FIG. 18 is a flowchart of a timing control program for the ultrasonic sensor serving as a road roughness sensor.

FIG. 18 shows a timing control program executed by the controller 40 to control the trigger timing of the ultra-sonic sensor 510.

At the initial stage of execution of the timing control program, a trigger signal flag $F_{Tr}$ in a memory block of RAM is checked at a step 1102. The trigger signal flag $F_{Tr}$ is set when the trigger signal is output through the output interface to the transmitter 510-1 and is reset when the trigger signal is not being output.

If the trigger signal flag $F_{Tr}$ is set when checked at the step 1102, then the time point value $T_1$ of a timer in RAM is latched at a step 1104. The timer continuously counts clock pulses from the clock generator. A trigger-signal-ON-time indicative time value $t_1$ is added to the latched time point $T_1$ at a step 1106. The resultant value $(T_1 + t_1)$, which serves as a trigger-signal-OFF time point, is transferred to and stored in a $T_2$-register in RAM, at a step 1108. Then the flag $F_{Tr}$ is set at a step 1110. A HIGH-level output is applied to the output interface as trigger signal $S_{Tr}$ at a step 1112.

During the period $t_1$ starting from the time $T_1$, the potential at the output interface is held HIGH to continue application of the trigger signal $S_{Tr}$ to the transmitter 510-1. The timer continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal flag $F_{Tr}$ was set at the step 1110 in the previous cycle of program execution, the answer at the step 1102 becomes "NO". Thus, control passes to a step 1114 in which the timer value $T_2$ of the second timer is accessed in RAM. Similarly to the first-mentioned timer, the timer continuously counts clock pulses from the clock generator. An OFF-interval-indicative time data $t_2$ is added to the latched timer value $T_2$ at a step 1116. The time data $t_2$ has a value corresponding to a predetermined interval between successive trigger signals. The resultant time value $(T_2 + t_2)$ is stored in the $T_1$-timer of RAM at a step 1118. Then, the flag $F_{Tr}$ is reset at a step 1120. After the step 1120, the output level at the output interface drops to LOW to terminate transmission of the trigger signal to the transmitter, at a step 1122.

The detailed structure and operation of the aforementioned preferred embodiment of the ultra-sonic sensor has been disclosed in the co-pending U.S. patent application Ser. No. 650,705 now U.S. Pat. No. 4,630,226, filed Sept. 14, 1984. The contents of the above-identified U.S. patent application Ser. No. 650,705 are hereby incorporated by reference for the sake of disclosure.

On the other hand, the road roughness sensor may also comprise an accelometer monitoring vertical acceleration of the front and rear ends of the vehicle body. Such an accelometer has been disclosed in the foregoing co-pending U.S. patent application Ser. No. 691,531 now Patent No. 4,770,438. The contents of these prior applications have been incorporated by reference for the sake of disclosure.

In any case, the road roughness sensor 510 produces a rough-road-condition-indicative signal which is HIGH when the road surface is relatively rough.

The controller 40 controls the position of the front spoiler fin 602 in substantially the same way as disclosed with respect to the first embodiment, i.e. on the basis of the vehicle speed, the wiper operating condition and the magnitude of the crosswinds. The road-roughness-indicative signal from the road roughness sensor 510 is taken into account in choosing the front spoiler fin position. For instance, when the road surface condition is relatively rough and thus the road-roughness-indicative signal is HIGH, the controller 40 issues a control signal ordering the front spoiler fin 602 to its rest position so that the fin will not strike the road surface and be damaged. On the other hand, when the road surface condition is rather smooth and therefore, the road roughness indicative signal remains LOW, then the controller allows the front spoiler fin to be moved to its working position assuming the other conditions are satisfied.

FIGS. 19 to 27 show a fifth embodiment of the aerodynamic accessory for the automotive vehicle according to the invention. The shown embodiment employs both front and rear spoiler fins 602 and 202. The controller 40 therefore controls both of the front and rear spoilers according to vehicle driving conditions.

Figure 19:
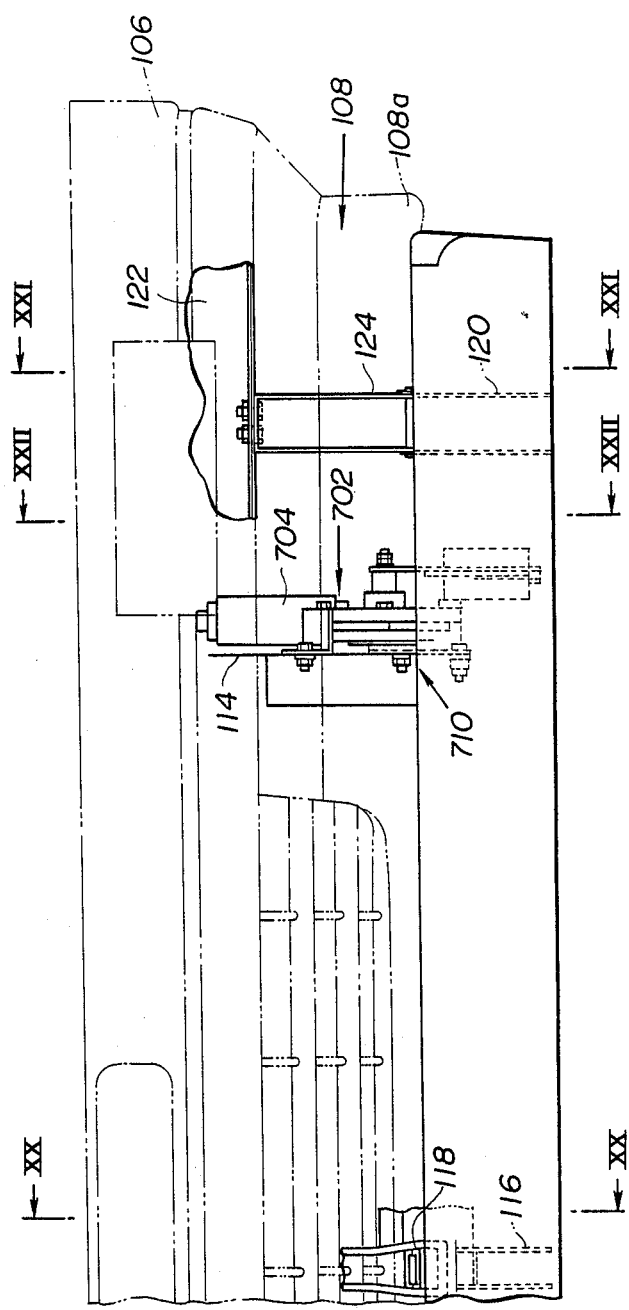
FIG. 19 is a cut-away front elevation of the front end of the automotive vehicle to which the fifth embodiment of the front spoiler is applied.
Figure 20:
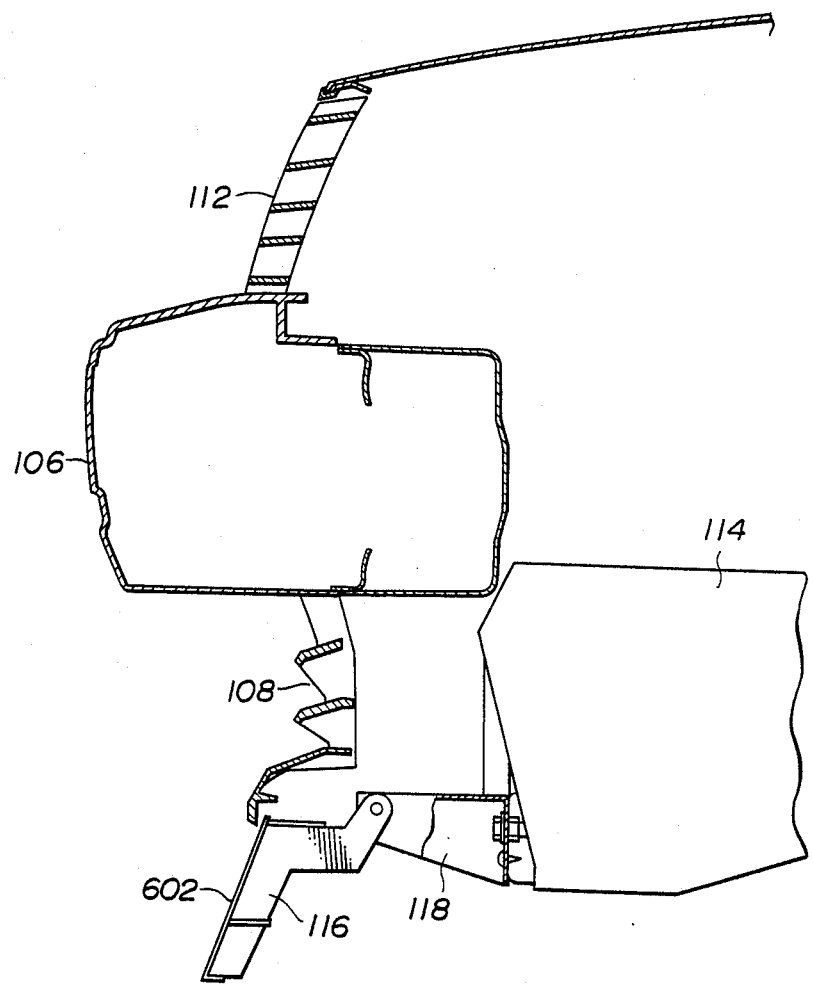
FIG. 20 is a section taken along line XX—XX of FIG. 19.
Figure 21:
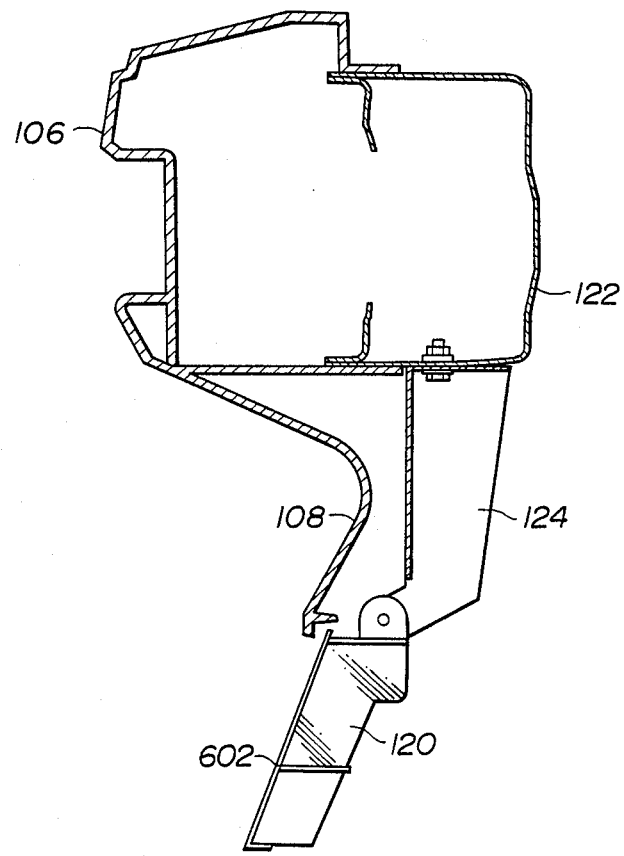
FIG. 21 is a section taken along line XXI—XXI of FIG. 19.

FIG. 19 is a front elevation of the front end of the vehicle. As can be seen in FIGS. 19 to 22, the front spoiler fin 602 is pivotally supported by a radiator core support (not clearly show), itself supportingly connected to a vehicle side member 114 (frame), and by the front bumper 106 by means of a mounting bracket 118. In order to facilitate pivotal connection of the front spoiler fin 602, a central hinge 116 is provided on the front spoiler fin, which hinge establishes pivotal engagement with the mounting bracket 118, as shown in FIG. 20. The front spoiler fin 602 is also pivotted at opposite ends by means of mounting brackets 124 and side hinges 120. The mounting brackets are fixed to a bumper armature 122 and extend downwards therefrom.

Figure 22:
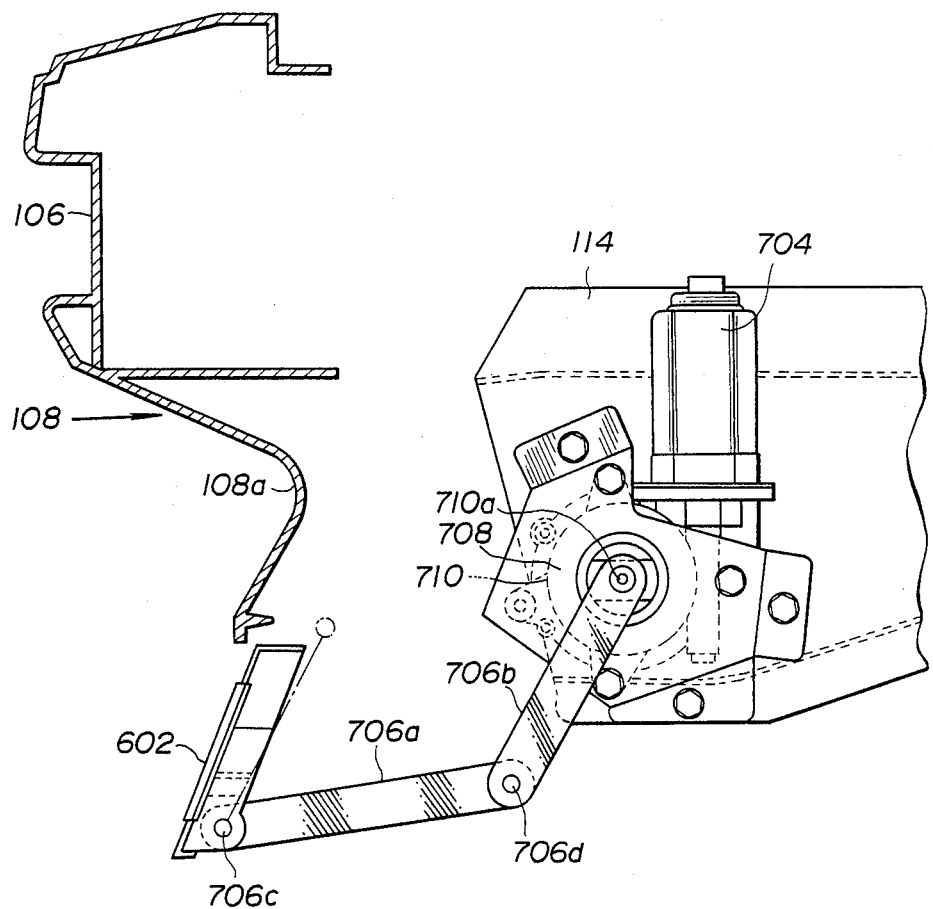
FIG. 22 is a section taken along line XXII—XXII of FIG. 19.

The driving motor 704 is mounted on the front end of the side member 114 by means of a mounting bracket 708, as shown in FIG. 22. A reduction gear assembly 710 is also mounted on the side member 114 by means of the mounting bracket 708. The reduction gear 710 is connected to the output shaft of the driving motor 704 to gear down the driving motor speed and output driving torque through its output shaft 710a. The output shaft 710a of the reduction gear assembly 710 is fixedly connected to the upper end of the second upper linkage 706b of a link mechanism 706. Therefore, the second linkage 706b is driven to rotate by the driving motor 704 through the reduction gear assembly 708. The lower end of the second linkage 706b is pivotably connected to the rear end of the first lower linkage 706a via a pivot pin 706d. The first linkage 706a is, in turn, pivotably connected t the lower edge of the front spoiler fin 602 via a pivot pin 706c.

Although not clearly shown in the drawings, a pair of position sensors 712 and 714 (see FIG. 25) are disposed near the second linkage 706b. The position sensor 712 comprises a limit switch and is designed to come into contact with the second link when the front spoiler 602 is moved to the working position. This position sensor 712 will be referred to hereafter as "working position sensor". On the other hand, the position sensor 714 is installed in a position at which it is in contact with the second linkage 706b when the rear spoiler fin 602 is in the rest position. Therefore, the position sensor 714 will be referred to as "rest position sensor".

Figure 23:
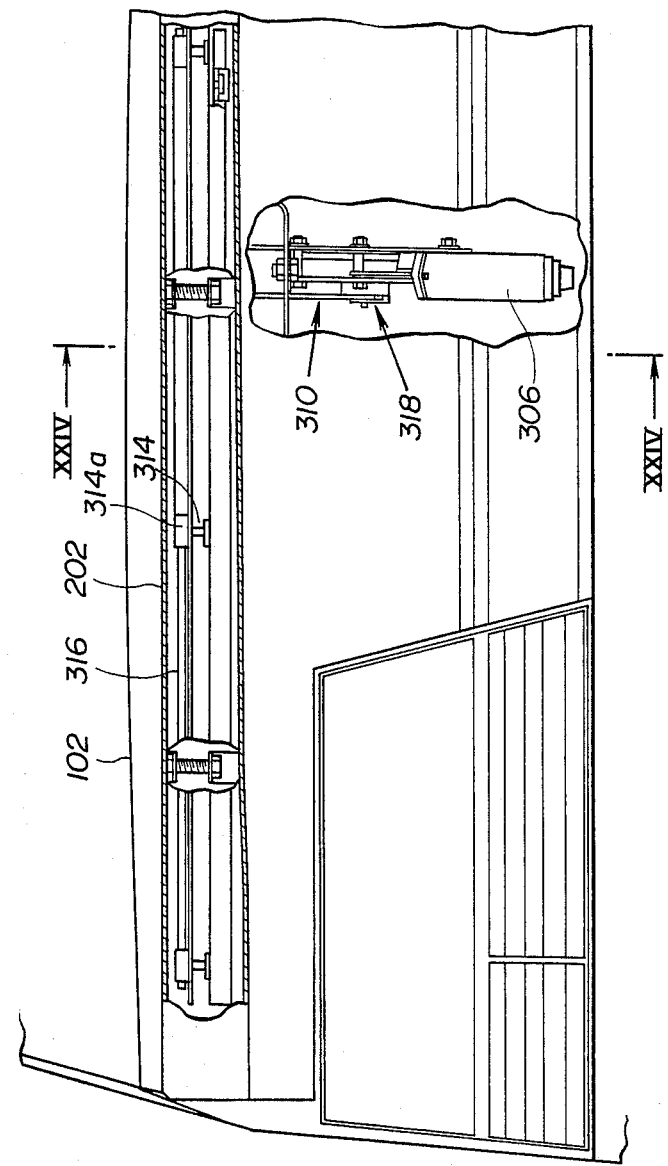
FIG. 23 is a cut-away elevation of a rear end of the automotive vehicle, to which the fifth embodiment of the adjustable rear spoiler is applied.
Figure 24:
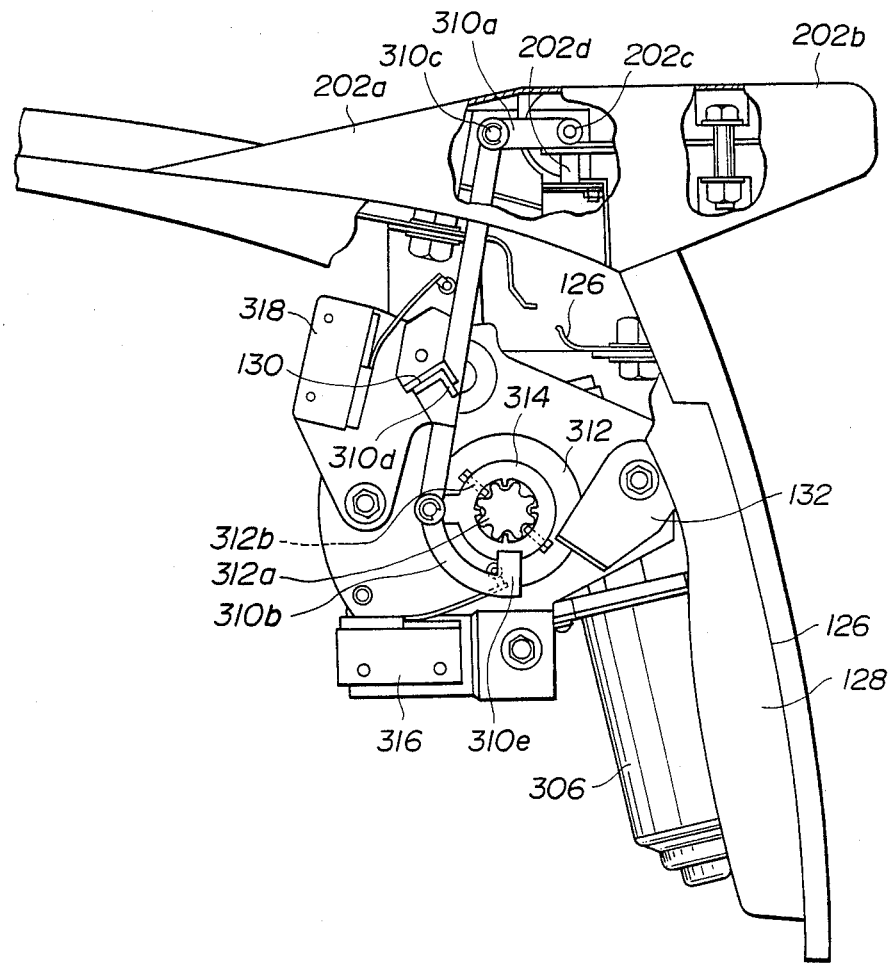
FIG. 24 is a section taken along line XXIV—XXIV of FIG. 23.

FIGS. 23 and 24 show the detailed structure of the adjustable-position rear spoiler of the fifth embodiment of the invention. FIG. 23 is a rear elevation of the vehicle showing the adjustable-position rear spoiler 20. As in the foregoing first and second embodiments, the trunk lid 102 is recessed along its rear edge to define a rear spoiler fin rest 104. As can be seen in FIG. 24, the rear spoiler fin 202 of this embodiment comprises a front stationary section fixed to the upper surface of the trunk lid 102 in the rear spoiler fin rest 104, and a rear movable section 202 b connected to the stationary section through a pivot shaft 202c for pivotable movement thereabout. The pivot shaft 202c extends transversely and is supported by a plurality of supports 202d built within the rear spoiler fin 202. Therefore, in this fifth embodiment, the movable section 202b of the rear spoiler fin 202 moves between the working position and the rest position relative to the stationary section 202a.

The driving motor 306 is mounted on the trunk lid inner panel 126 by means of a mounting bracket 128. The motor 306 is associated with a reduction gear assembly 312. A motor link 314 is fixed to an output gear 312a of the reduction gear assembly 12 by means of a fixing bolt 312b. The motor link 314 is pivotably connected to the lower second linkage 310a to drive the latter vertically as the driving motor 306 rotates. The upper end of the second linkage 310b is pivotably connected to the front end of the first upper linkage 310a which is, in turn, connected to the movable section 202b of the rear spoiler fin 202 through the pivot shaft 202c. The first linkage 310a is pivotable about a pivot pin 310c to move the movable 202b of the rear spoiler fin between the working position and the rest position.

The second linkage 310b is also provided with a pair of strips 310d and 310e. The strip 310d is designed to abut a stopper member 130 when the movable section 202b is shifted to the rest position. On the other hand, the strip 310e is designed to abut another stopper member 132 when the movable section 202b of the rear spoiler fin 202 is shifted to the working position. A pair of position sensors 316 and 318 are disposed near the second linkage 310b. The position sensors 316 and 318 comprise limit switches. The position sensor 318 detects the rest position of the rear spoiler fin 202. Therefore, the position sensor 318 will be referred to hereafter as "rest position sensor". On the other hand, the position sensor 316 detects the working position of the rear spoiler fin 202, and will be referred to hereafter as "working position sensor".

Figure 25:
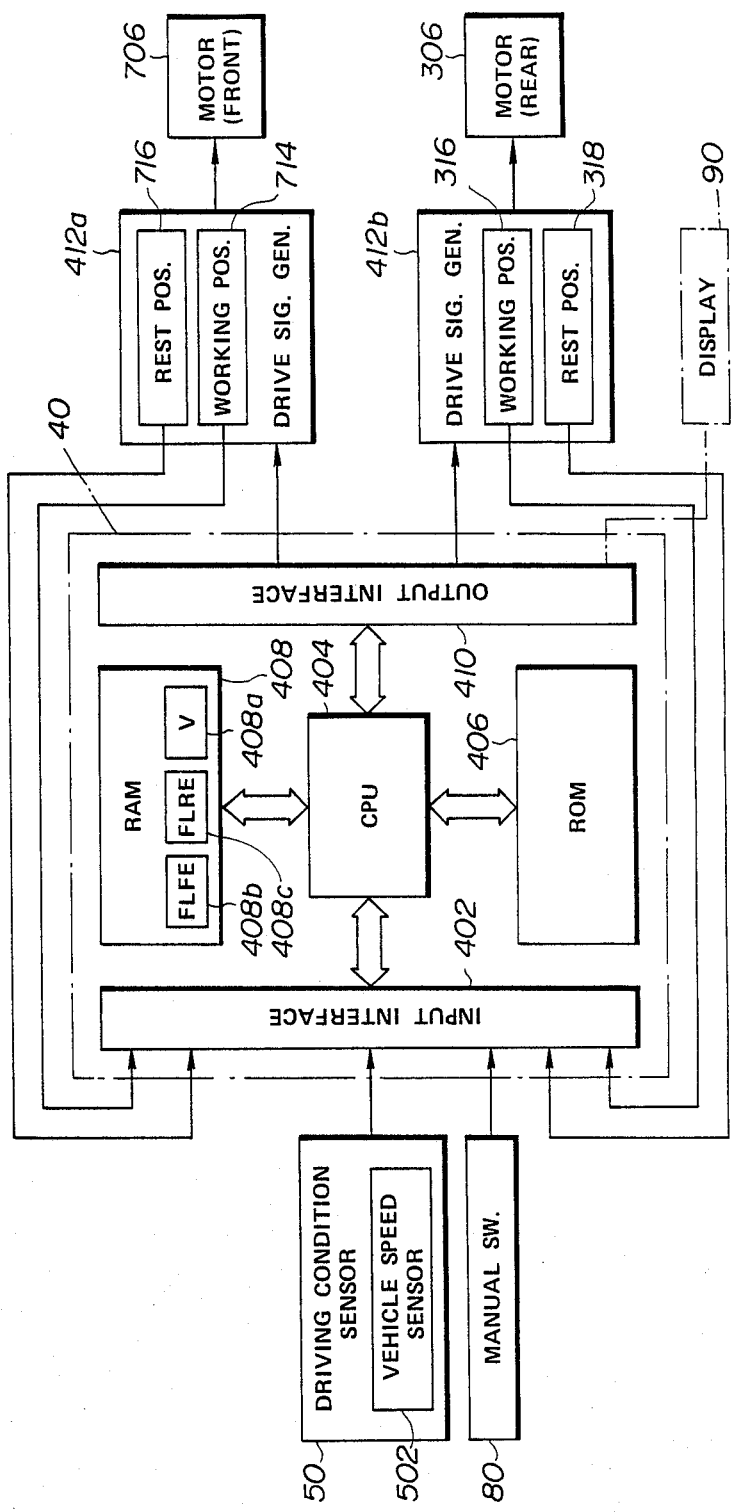
FIG. 25 is a schematic block diagram of the fifth embodiment of a control system according to the invention.

FIG. 25 shows the fifth embodiment of the spoiler control system of the invention, which controls both front and rear spoilers 602 and 202. The driving condition sensor 50 refers to the various sensors such as the wiper operation sensor, the crosswind sensor, the road friction sensor, the road roughness sensor and so forth described with respect to the foregoing embodiments. The driving condition sensor 50 includes the vehicle speed sensor 502 which outputs a pulse train having a frequency proportional to the vehicle speed. The working position sensor 714 and the rest position sensor 716 of the front spoiler driving system are associated with a drive signal generator 412a which is, in turn, connected to the driving motor 706. The working position sensor 714 and the rest position sensor 716 are also connected to the controller 40 through the input interface 402. Likewise, the working position sensor 316 and the rest position sensor 318 are associated with the drive signal generator 412b which is, in turn, connected to the driving motor 306. The working position sensor 316 and the rest position sensor 318 are also connected to the controller 40 through the input interface.

The controller 40 includes the input interface 402, CPU 404, ROM 406, RAM 408 and output interface 410 as mentioned above. The RAM includes a memory address 408a serving as a vehicle speed counter counting vehicle speed sensor signal pulses in order to derive the vehicle speed. The RAM 408 also has memory blocks 408b and 408c serving as flag registers The flag register 408b holds a flag FLFE indicative of the presence of the front spoiler 60 in its working position. The flag register 408c holds a flag FLRE indicative of the presence of the rear spoiler in its working position.

The output interface 410 of the controller 40 outputs the front spoiler control signals $C_F$ and the rear spoiler control signal $C_R$ to the drive signal generators 412a and 412b respectively. The control signals specify the operating polarity of the driving motor.

The front spoiler working position flag FLFE is set in response to the position sensor signal from the working position sensor 712 in the drive signal generator 412a. Similarly, the rear spoiler working position flag FLRE is set in response to the position sensor signal from the working position sensor 316. The flag FLFE is reset in response to the front spoiler rest position signal from the rest position sensor 714. Similarly, the working position flag FLRE is reset in response to the rest position signal from the rest position sensor 318.

As shown in phantom line in FIG. 25, a manual switch 80 may be connected to the controller 40 to allow manual spoiler control. The manual switch 80 may be operable between a rest position by which front and rear spoilers 60 and 20 are ordered to their rest positions, a first spoiler position wherein only the front spoiler is shifted to the working position, a second spoiler position wherein only the rear spoiler 20 is shifted to the working position, a third spoiler position wherein both of the front and rear spoilers are shifted to the working position, and an auto position allowing automatic spoiler position control. Furthermore, a display unit 90 may be connected to the controller to indicate the spoiler positions. The display unit may be a graphic display representing the spoiler positions graphically.

Figure 26:
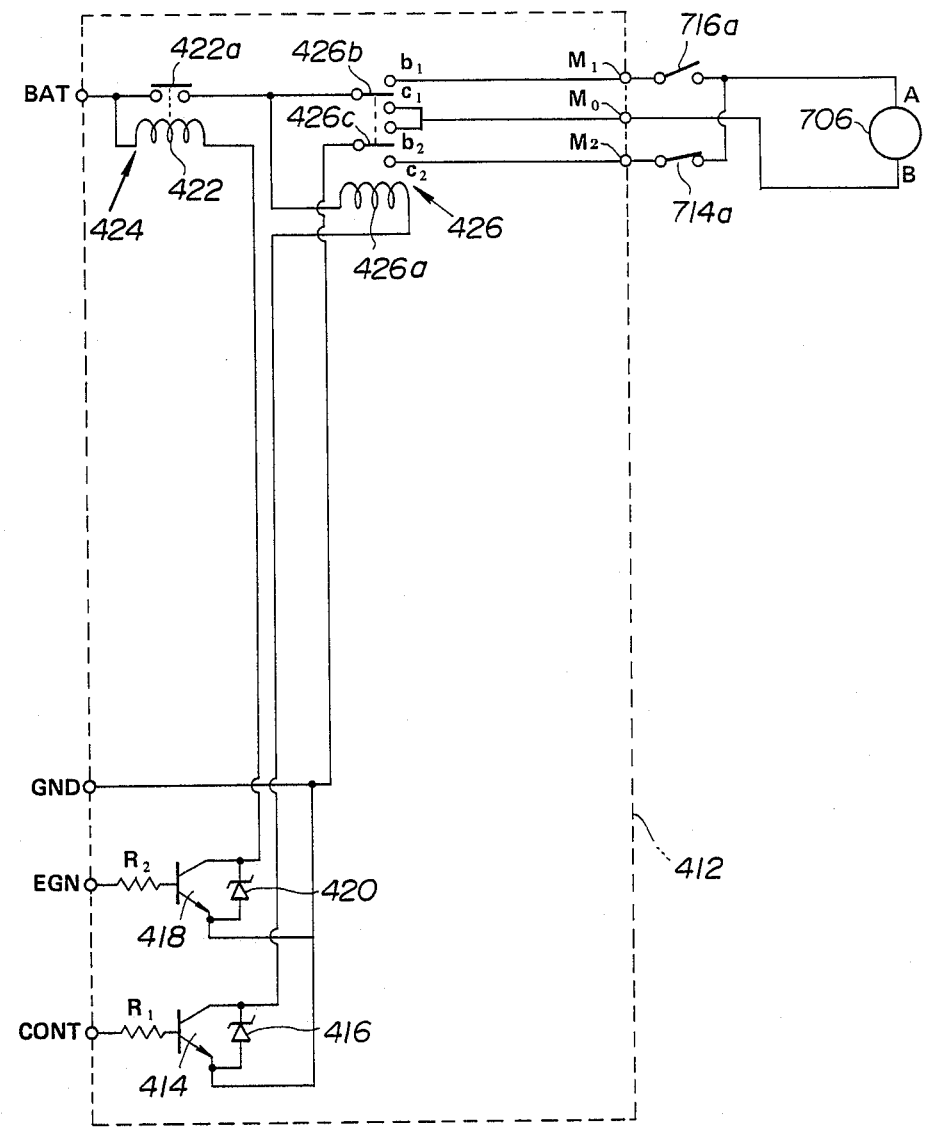
FIG. 26 is a circuit diagram of a drive circuit employed in the fifth embodiment of the control system of FIG. 25.

FIG. 26 shows the internal circuitry of the drive signal generator 412a and 412b, which have substantially same circuitry. The drive signal generator includes a transistor 414, the base electrode of which is connected to the output interface 410 of the controller 40 through a resistor $R_1$. A circuit including a diode 416 connects the emitter electrode to the collector electrode of the transistor 414 to complete a short current loop. The drive signal generator 412 has another transistor 418, the base electrode of which is connected to an ignition switch (not shown) through EGN terminal and a resistor $R_2$. The collector electrode and the emitter electrode of the transistor 418 are also connected in a current loop through a circuit including a diode 420.

The drive signal generator 412 has a grounding terminal GND and a terminal BAT connected to a vehicular battery (not shown). The emitter electrodes of the transistors 414 and 418 are connected to ground through the grounding terminal GND. The collector electrodes of the transistors 414 and 418 are connected to a relay coils 422 and 426a of an ignition relay 424 and 426, respectively, which are connected to the battery through the BAT terminal.

The drive signal generator 412 also has a control relay 426 including a relay coil 426a and first and second movable contactors 426b and 426c. The movable contactor 426b is movable between terminals $b_1$ and $c_1$, and the movable contactor 426c is movable between terminals $b_2$ and $c_2$. The movable contactor 426b is also connected to a normally open ignition relay switch 422a. On the other hand, the movable contactor 426c is connected to ground through the grounding terminal GND. The terminal $b_1$ is connected to the A-terminal of the driving motor 706 through the normally open contact 716a of the rest position sensor 716 through a terminal $M_1$. The terminal $c_2$ is connected, through a terminal $M_2$, to the normally open contact 714a of the working position sensor 714. The terminals $c_1$ and $b_2$ are connected in parallel to the B-terminal of the driving motor 706 through a terminal $M_0$. The movable contactors 426b, c are normally biased to their "b" terminals.

When the ignition switch is turned to the ACC position (for power supply to electric accessories), ON position (ignition power is supplied to ignition system and power supply to the vehicle electric accessories is continued), or a START position (power is supplied to a starter motor for engine cranking), the ignition relay coil 422 is energized via the transistor 418. Energizing the relay coil 422 closes the normally open ignition relay switch 422a and so connects the vehicle battery to the contactor 426b.

As discussed above, the controller 40 outputs the front spoiler control signal $C_F$ specifying one of the working or rest positions. When the working position is desired, the control signal $C_F$ goes HIGH apply an on-bias to the base electrode of the transistor 414 to render it conductive. This completes a power supply circuit for the relay coil 426 which then pulls the movable contactors 426b, c down to their "c" terminals. Thus, battery voltage is applied to the B terminal of motor 706 via the current path 422a, 426b, $c_1$, $M_o$, and at the same time, the $M_2$ terminal is grounded via terminal $c_2$. Thus, if the front spoiler 60 is currently in its rest position so that the rest position switch 716a is closed, the motor 706 will be energized in the polarity B→A to drive the front spoiler 60 towards its working position. Upon reaching the working position, the switch 716a will open and the working position switch 714a will close, whereby the motor 706 will stop running until the control signal $C_F$ again changes state.

When the control signal ordering the rest position is output through the output interface 410, the transistor 414 is rendered nonconductive. Thus, the power supply to the relay coil 426 is interrupted and the contactors 426b and 426c return to the terminals $b_1$ and $b_2$. As a result, the battery power flows through the ignition relay switch 422a, the contactor 426b, the terminal $c_1$, the closed working position switch 714a, the A- and B-terminals of the driving motor 706, the contactor 426c, the terminal $c_2$ to ground. Thus, the driving motor 706 is driven in the opposite direction to move the front spoiler 60 to the rest position. After the front spoiler 60 reaches the rest position, the switch 714a opens while the switch 716a closes. As a result, the power supply circuit for the motor is broken to stop the front spoiler at the working position.

The operation of the drive signal generator 412 can be summarized by the following tables:

TABLE I

| Control Signal $C_F$ | A-terminal | B-terminal |
|---|---|---|
| HIGH (= Working Position) | GND | BAT |
| LOW (= Rest Position) | BAT | GND |

TABLE II

| Spoiler Position | 716a | 714a |
|---|---|---|
| working position | OPEN | CLOSED |
| to working position | CLOSED | OPEN |
| to rest Position | OPEN | CLOSED |
| rest Position | CLOSED | OPEN |

According to the fifth embodiment, the cornering characteristics of the vehicle can be controlled by selecting the front and rear spoiler positions depending upon the vehicle driving conditions. When the front spoiler is in the working position and the rear spoiler is in the rest position, the lift coefficient at the front end $C_{FL}$ is reduced to increase the traction at the front wheels and so enhance the over-steer characteristics of the vehicle. On the other hand, when the rear spoiler is in the working position and the front spoiler is in the rest position, the lift coefficient at the rear end $C_{LR}$ is decreased to increase the traction at the rear end of the vehicle, and so enhance the under-steer characteristics. When both front and rear spoilers are in the working position, the vehicle steering characteristics may not be noticeably different since the lift coefficients at the front end $C_{LF}$ and at the rear end $C_{LR}$ are both reduced, thus increasing road traction characteristics of the front and rear wheels evenly. This ensures good drivability.

Figure 27:
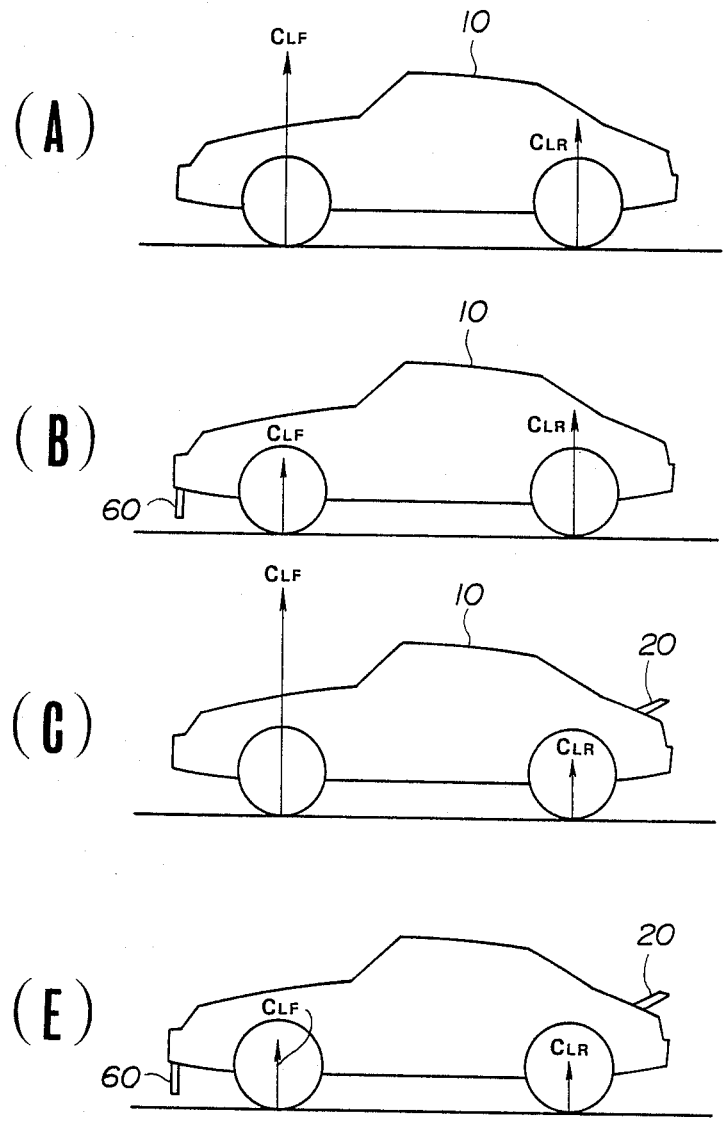
FIGS. 27(A) to 27(D) are diagrams of the operating positions of the fifth embodiment of the front and rear spoilers of the invention.

Experiments have been performed by the inventor on a Nissan Leopard with an overall lift coefficient of 0.377, a front lift coefficient $C_{LF}$ of 0.155 and a rear lift coefficient $C_{LR}$ of 0.222. Results of these experiments are summarized in the following table and depicted in FIG. 27:

| FIG. 27 | Front Spoiler | Rear Spoiler | $C_L$ | $C_{LF}$ | $C_{LR}$ |
|---|---|---|---|---|---|
| (A) | REST | REST | 0.377 | 0.155 | 0.222 |
| (B) | WORKING | REST | 0.332 | 0.072 | 0.259 |
| (C) | REST | WORKING | 0.186 | 0.160 | 0.027 |
| (D) | WORKING | WORKING | 0.167 | 0.098 | 0.068 |

In practice, the spoiler position should be a function not only of the lift coefficient of vehicle but also the drag coefficient $C_d$ and also the wind cross-section which affect fuel economy.

It should be appreciated that, though specific sensors for spoiler control parameters have been disclosed in the foregoing embodiments, other parameters can be taken into account while carrying out the driving condition dependent spoiler control. For example, vehicular deceleration causing nose-dive may be used as a control parameter. In this case, the front spoiler should be shifted to the rest position when abrupt deceleration is detected so that the lower end of the front spoiler will not strike the road surface. A load sensor for detecting weight balance in the vehicle may also be employed by the spoiler control system. The load balance may be detected by a pair of ultra-sonic vehicle height sensors installed at the front and rear ends of the vehicle, for example. In this case, spoiler control may be used to balance the load on the vehicle. A photo sensor may also be used to detect rainy conditions by detecting light reflected or refracted by air borne precipitation to detect wet road conditions. Furthermore, a slope sensor may be useful for detecting the road grade for use in controlling the spoiler positions so as to ensure good balance of the road traction between the front and rear wheels.

In addition, an air pressure sensor sensitive to air pressure exerted on the vehicle body, a cornering force sensor, such as a load-cell or gyroscope for detecting steering behavior can be employed to provide vehicle driving condition indicative control parameters.

While the present invention has been disclosed hereabove in terms of the specific embodiments of the invention, the invention should be appreciated as to be embodied in any way including any possible embodiments and modifications which do not depart from the principle of the appended claims.

What is claimed is:

1. An aerodynamic accessory for an automotive vehicle comprising:
   a spoiler member capable of projecting from an external surface of a vehicle body for reducing the lift coefficient of the vehicle body while the vehicle is moving, said spoiler member being movable between a first position in which it projects from said external surface of the vehicle body, and a second position in which it is enclosed substantially within the contours of the vehicle body whereby said spoiler member has no aerodynamic effect;
   an actuator associated with said spoiler member for actuating said spoiler member to either of said first and second positions;
   sensor means for monitoring vehicle driving conditions including vehicle speed and environmental conditions, and producing a driving condition indicative signal and an environmental condition indicative signal in response to detected conditions; and
   a controller responsive to said vehicle driving condition indicative signal and said environmental condition indicative signal for deriving a control signal to control operation of said actuator and thereby controlling the position of said spoiler member, said controller producing a control signal for controlling the movement of said spoiler member to said first position when at least either of a predetermined vehicle driving condition is satisfied, as indicated by said vehicle driving condition indicative signal or an environment condition is satisfied as indicated by said environmental condition indicative signal, and otherwise producing a control signal for controlling the movement of said spoiler member to said second position.

2. The aerodynamic accessory as set forth in claim 1, wherein said wet road sensor comprises a wiper operation detector producing a wet road indicative signal while a vehicular wiper system is in operation.

3. The aerodynamic accessory as set forth in claim 1, wherein said wet road sensor comprises an ultra-sonic sensor for detecting water splashed by a wheel and producing a wet road indicative signal.

4. An aerodynamic accessory for an automotive vehicle comprising:
   a spoiler member capable of projecting from an external surface of a vehicle body for reducing the lift coefficient of the vehicle body while the vehicle is moving, said spoiler member being movable between a first position in which it projects from said external surface of the vehicle body, and a second position in which it is enclosed substantially within the contours of the vehicle body whereby said spoiler member has no aerodynamic effect;

an actuator associated with said spoiler member for actuating said spoiler member to either of said first and second positions;

sensor means for monitoring vehicle driving speed and producing a vehicle speed indicative signal and for monitoring an environmental condition and producing an environmental condition indicative signal; and a controller responsive to said vehicle speed indative signal for deriving a control signal to control operation of said actuator and thereby control the position of said spoiler member, said controller comparing said vehicle speed indicative signal value with a first and a second reference value, wherein the first reference value represents a high speed criterion and the second reference value represents a low speed criterion, said controller outputting said control signal for controlling the movement of said spoiler member to said first position when said vehicle speed indicative signal value is greater than said first reference value, and for controlling the movement of said spoiler member to said second position when said vehicle speed indicative signal value is smaller than said second reference value, wherein said controller produces said control signal for controlling the movement of said spoiler member to one of said first and second positions in accordance with said environmental condition indicative signal while said vehicle speed indicative signal value lies between said frist and second reference values.

5. The aerodynamic accessory as set forth in claim 4, wherein said sensor means includes a wet road sensor for detecting wet road surface conditions and producing a wet road condition indicative signal, and said controller is responsive to said wet road condition indicative signal for producing said control signal for controlling the movement of said spoiler member to said first position while the vehicle speed indicative signal value lies between said first and second reference values.

6. The aerodynamic accessory as set forth in claim 4, wherein said sensor means includes a crosswind sensor for measuring the intensity of crosswinds exerted on the vehicle body and producing a crosswind indicative signal when the crosswind is stronger than a predetermined value, and said controller is responsive to said crosswind indicative signal for producing said control signal for controlling the movement of said spoiler member to said first position while said vehicle speed indicative signal value lies between said first and second reference values.

7. The aerodynamic accessory as set forth in claim 4, wherein said spoiler member is a rear spoiler fin.

8. The aerodynamic accessory as set forth in claim 4, wherein said spoiler member is a front spoiler fin which projects downwards from the lower edge of the front end of the vehicle body when actuated to said first position.

9. The aerodynamic accessory as set forth in claim 8, wherein said sensor means includes a road roughness sensor responsive to relatively rough road surface conditions to produce a rough road indicative signal, and said controller is responsive to said rough road indicative signal to control the movement of said spoiler member to said second position irrespective of the vehicle speed indicative signal value.

10. A method for controlling the position of an adjustable-position air-spoiler for an automotive vehicle comprising the steps of:

monitoring vehicle speed and producing a vehicle driving condition indicative signal;

monitoring environmental conditions of the moving vehicle and producing an environmental condition indicative signal;

electronically judging the operating conditions of the moving vehicle on the basis of said vehicle driving condition indicative signal and said environmental condition indicative signal; and adjusting the spoiler position between a first position in which said spoiler projects from the external surface of the vehicle body in order to reduce the lift coefficient of the vehicle and a second position in which said spoiler has minimal aerodynamic effect, said spoiler being adjusted to said first position when said vehicle speed is higher than a first higher speed criterion, and being adjusted to said second position when said vehicle speed is lower than a second lower speed criterion, and when said vehicle speed is between said first and second speed criteria, said spoiler being adjusted to said first position when said electronically judged condition indicates a need for increased tire/road traction.

11. The method as set forth in claim 10, wherein said spoiler is adjusted to one of said first and second positions depending upon said environmental condition indicative signal value when said vehicle speed lies between said first and second speed criteria.

12. The method as set forth in claim 11, wherein said spoiler is a rear spoiler.

13. The method as set forth in claim 11, wherein said spoiler is a front spoiler capable of projecting downwards from the lower edge of the front end of the vehicle body.

14. The method as set forth in claim 13, wherein said environmental conditions are monitored by monitoring the roughness of the road surface, and said spoiler is adjusted to said second position when relatively rough road conditions are detected.

15. An aerodynamic accessory for an automotive vehicle comprising:

a first spoiler member capable of projecting from an external surface of the front of a vehicle body for reducing the lift coefficient of the vehicle body while the vehicle is moving, said first spoiler member being movable between a first position, in which it projects from said external surface of the front of the vehicle body, and a second position, in which it is enclosed substantially within the contours of the vehicle body;

a second spoiler member capable of projecting from an external surface of the rear of the vehicle body for reducing the lift coefficient of the vehicle body while the vehicle is moving, said second spoiler member being movable between a first position, in which it projects from said external surface of the rear of the vehicle body, and a second position, in which it is enclosed substantially within the contours of the vehicle body;

means, connected to said first and second spoiler members, for moving said spoiler members to either of said first and second positions;

sensor means for monitoring vehicle driving speed and producing a driving condition indicative signal, said sensor means also detecting environmental conditions outside the moving vehicle and producing an environmental condition indicative signal; and a controller responsive to said vehicle driving condition indicative signal and said environmental condition indicative signal for deriving a control signal to control operation of said moving means and thereby control the position of said first and second spoiler members, said controller producing a control signal for controlling the movement of each of said spoiler members to their respective said first positions when at least either of a predetermined vehicle driving condition, as indicated by said vehicle driving condition indicative signal, or an environmental condition, as indicated by said environmental condition indicative signal, are satisfied, and otherwise producing a control signal for controlling the movement of each of said spoiler members to their respective said second positions.

16. The aerodynamic accessory as set forth in claim 15, wherein said sensor means includes a vehicle speed sensor for producing a vehicle speed indicative signal.

17. The aerodynamic accessory as set forth in claim 15, wherein said sensor means includes a sensor for detecting wet road conditions.

18. The aerodynamic accessory as set forth in claim 17, wherein said wet road sensor comprises a wiper operation detector producing a wet road indicative signal whicle a vehicular wiper system is in operation.

19. The aerodynamic accessory as set forth in claim 17, wherein said wet road sensor comprises an ultrasonic sensor for detecting water splashed by a wheel and producing a wet road indicative signal.

20. The aerodynamic accesory as set forth in claim 15, wherein said sensor means includes a crosswind sensor for measuring the intensity of crosswinds exerted on the vehicle body and producing a crosswind indicative signal when the crosswind is stronger than a given value.

21. The aerodynamic accessory as set forth in claim 15, wherein said sensor means includes a road roughness sensor for producing a rough road indicative signal when the roughness of the road surface exceeds a predetermined level.

22. The aerodynamic accessory as set forth in claim 16, wherein said controller compares said vehicle speed indicative signal value with a first and a second reference value, said first reference value representing a high speed criterion and said second reference value representing a low speed criterion, said controller outputting said control signal for controlling the movement of said spoiler members to their respective said first positions when said vehicle speed indicative signal value is greater than said first reference value, and for controlling the movement of said spoiler members to said second position when said vehicle speed indicative signal value is smaller than said second reference value.

23. The aerodynamic accessory as set forth in claim 22, wherein said controller produces said control signal for controlling the movement of said spoiler members to one of their respective said first and second positions in accordance with said environmental condition indicative signal while said vehicle speed indicative signal value lies between said first and second reference values.

24. The aerodynamic accessory as set forth in claim 23, wherein said sensor means includes a wet road sensor for detecting wet road surface conditions and producing a wet road condition indicative signal, and said controller is responsive to said set road condition indicative signal for producing said control signal for controlling the movement of said spoiler members to their respective said first positions while the vehicle speed indicative signal value lies between said first and second reference values.

25. The aerodynamic accessory as set forth in claim 24, wherein said sensor means includes a crosswind sensor for measuring the intensity of crosswinds exerted on the vehicle body and producing a crosswind indicative signal when the crosswind is stronger than a predetermined value, and said controller is responsive to said crosswind indicative signal for producing said control signal for controlling the movement of said spoiler members to their respective said first positions while said vehicle speed indicative signal value lies between sais first and second reference values.

26. The aerodynamic accessory as set forth in claim 15, further including a switch for manually and independently controlling the movement of said first and second spoiler members between their respective first and second positions.

* * * * *